(12) United States Patent
Yamaoka et al.

(10) Patent No.: US 12,005,761 B2
(45) Date of Patent: Jun. 11, 2024

(54) AIR DISCHARGE DEVICE

(71) Applicant: DENSO CORPORATION, Kariya (JP)

(72) Inventors: Jun Yamaoka, Kariya (JP); Masaharu Sakai, Kariya (JP); Yuuji Okamura, Kariya (JP); Yasuhiko Niimi, Kariya (JP); Takahito Nakamura, Kariya (JP); Yusuke Komatsubara, Kariya (JP); Marie Nagahama, Kariya (JP); Yasuki Omori, Kariya (JP); Shogo Hayakawa, Kariya (JP); Satoshi Takotani, Kariya (JP)

(73) Assignee: DENSO CORPORATION, Kariya (JP)

( * ) Notice: Subject to any disclaimer, the term of this patent is extended or adjusted under 35 U.S.C. 154(b) by 886 days.

(21) Appl. No.: 17/065,045

(22) Filed: Oct. 7, 2020

(65) Prior Publication Data
US 2021/0031596 A1    Feb. 4, 2021

Related U.S. Application Data

(63) Continuation of application No. PCT/JP2019/014658, filed on Apr. 2, 2019.

(30) Foreign Application Priority Data

Apr. 11, 2018 (JP) .................................. 2018-076325
Oct. 23, 2018 (JP) .................................. 2018-199383
Dec. 25, 2018 (JP) .................................. 2018-240806

(51) Int. Cl.
*B60H 1/34*  (2006.01)
*F24F 13/072* (2006.01)

(52) U.S. Cl.
CPC ......... *B60H 1/3407* (2013.01); *B60H 1/3457* (2013.01); *F24F 13/072* (2013.01)

(58) Field of Classification Search
CPC ...... B60H 1/3407; F24F 13/06; F24F 13/072; F24F 2013/0612
(Continued)

(56) References Cited

U.S. PATENT DOCUMENTS 10,099,536 B2 * 10/2018 Albin .................. B60H 1/3421
11,535,081 B1 * 12/2022 Kearney ............ B60H 1/00685
(Continued)

FOREIGN PATENT DOCUMENTS

CN    203823891 U    9/2014
CN    104769367 A    7/2015
(Continued)

OTHER PUBLICATIONS

U.S. Appl. No. 17/064,831, filed Oct. 7, 2020, Jun Yamaoka, et al.
(Continued)

*Primary Examiner* — Allen R. B. Schult
(74) *Attorney, Agent, or Firm* — Harness, Dickey & Pierce, P.L.C.

(57) ABSTRACT

An air discharge device includes an air discharge unit for discharging an air flow. The air discharge unit includes at least one main hole from which an air flow is blown out as a working air flow, and a separation structure configured to separate a central portion of a thickness of a velocity boundary layer of the working air flow from a center line of the main hole at a downstream side of the main hole.

6 Claims, 25 Drawing Sheets

(58) Field of Classification Search
USPC .......................................................... 454/152
See application file for complete search history.

(56) References Cited

U.S. PATENT DOCUMENTS

| | | |
|---|---|---|
| 2013/0115868 A1 | 5/2013 | Davis et al. |
| 2014/0357178 A1 | 12/2014 | Doll et al. |
| 2015/0300385 A1 | 10/2015 | Akagi et al. |
| 2016/0101668 A1 | 4/2016 | Doll et al. |
| 2016/0236541 A1 | 8/2016 | Gruenbeck et al. |
| 2019/0118621 A1 | 4/2019 | Doll et al. |

FOREIGN PATENT DOCUMENTS

| | | |
|---|---|---|
| DE | 102013210053 B3 | 9/2014 |
| JP | H05073449 U | 10/1993 |
| JP | H08201216 A | 8/1996 |
| JP | H08210943 A | 8/1996 |
| JP | H08318176 A | 12/1996 |
| JP | 2000280736 A | 10/2000 |
| JP | 2015193298 A | 11/2015 |

OTHER PUBLICATIONS

U.S. Appl. No. 17/065,267, filed Oct. 7, 2020, Jun Yamaoka, et al.

* cited by examiner

AIR DISCHARGE DEVICE

CROSS REFERENCE TO RELATED APPLICATIONS

The present application is a continuation application of International Patent Application No. PCT/JP2019/014658 filed on Apr. 2, 2019 which designated the U.S. and claims the benefit of priority from Japanese patent applications No. 2018-076325 filed on Apr. 11, 2018, Japanese patent application No. 2018-199383 filed on Oct. 23, 2018 and Japanese patent application No. 2018-240806 filed on Dec. 25, 2018, the entire contents of which are incorporated herein by reference.

TECHNICAL FIELD

The present disclosure relates to an air discharge device having an air discharge unit configured to discharge an air flow.

BACKGROUND

Conventionally, an air nozzle is known in which an auxiliary air outlet is provided around a main hole forming a working air flow, so as to form a support air flow that can reduce a suction of the air drawn into the working air flow.

SUMMARY

An object of the present disclosure is to provide an air discharge device capable of increasing a reaching distance of a working air flow discharged from a main hole.

According to an aspect of the present disclosure, an air discharge device includes an air discharge unit configured to discharge an air flow. The air discharge unit includes at least a main hole from which an air flow as a working air flow is blown out, and a separation structure configured to separate a central portion of a thickness of a velocity boundary layer of the working air flow from a center line of the main hole at a downstream side of an outlet of the main hole.

In this way, if a structure configured to separate the central portion of the working air flow blown from the main hole from the central portion of the thickness of the velocity boundary layer of the working air flow is adopted, attenuation of the flow velocity in the central portion of the working air flow is reduced, and thereby it is possible to increase the reaching distance of the working air flow.

BRIEF DESCRIPTION OF THE DRAWINGS

The above and other objects, features and advantages of the present disclosure will become more apparent from the following detailed description made with reference to the accompanying drawings.

DESCRIPTION OF EMBODIMENT

Figure 1:
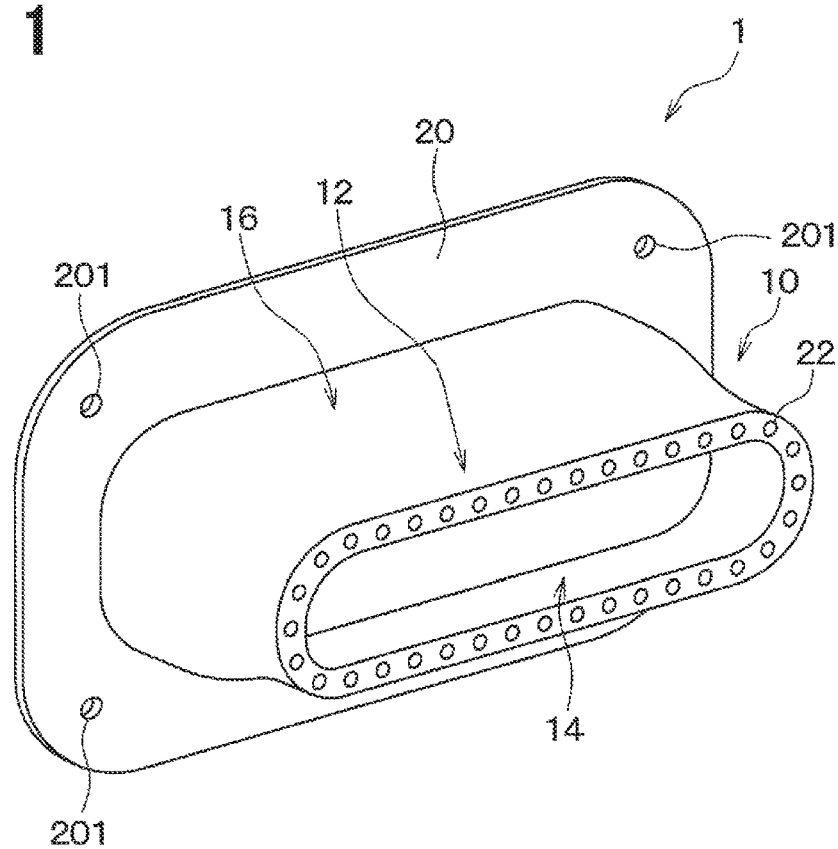
FIG. 1 is a schematic perspective view of an air discharge device according to a first embodiment.

The inventors of the present disclosure have deeply studied an air suction action when an air flow as a working air flow is discharged from a main hole, in order to further increase a reaching distance of the working air flow. As a result, it was found that the air suction action is caused by a lateral vortex generated by a shear force due to a velocity gradient of the working air flow when the working air flow is blown from the main hole. The lateral vortex is a vortex having the center of the vortex perpendicular to the flow direction of the main air flow.

Further studies by the inventors of the present disclosure have known that, in the vicinity on a downstream side of the main hole, innumerable lateral vortices generated in the velocity boundary layer are combined and developed in a center area of the velocity boundary layer into a large-scale vortex, thereby making the air suction action to be stronger.

However, if only the auxiliary air outlet is provided around the main hole, it may be difficult to further improve a reaching distance of the air flow.

An object of the present disclosure is to provide an air discharge device capable of increasing a reaching distance of a working air flow discharged from a main hole.

Generally, a central portion of the working air flow is less affected by the air suction action than a portion other than the central portion of the working air flow, and the reaching distance of the working air flow blown from the main hole tends to be longer in the central portion of the working air flow. According to the studies by the present inventors, it has been found that a separation between the central portion of the working air flow and a velocity boundary layer is effective for increasing the reaching distance of the working air flow discharged from the main hole.

According to an aspect of the present disclosure, an air discharge device includes an air discharge unit configured to discharge an air flow. The air discharge unit includes at least a main hole from which an air flow as a working air flow is blown out, and a separation structure configured to separate a central portion of a thickness of a velocity boundary layer of the working air flow from a center line of the main hole at a downstream side of an outlet of the main hole.

In this way, if a structure configured to separate the central portion of the working air flow blown from the main hole from the central portion of the thickness of the velocity boundary layer of the working air flow is adopted, attenuation of the flow velocity in the central portion of the working air flow is reduced, and thereby it is possible to increase the reaching distance of the working air flow.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. The following embodiments may be partially combined with each other even if such a combination is not explicitly described as long as there is no disadvantage with respect to such a combination.

First Embodiment

The present embodiment will be described with reference to FIGS. 1 to 8. An air discharge device 1 of the present embodiment is used for an air outlet of an air conditioning unit that air-conditions a passenger compartment. The air conditioning unit not shown is disposed, for example, inside an instrument panel provided at the foremost portion in the passenger compartment. The air outlet of the air conditioning unit is provided inside an instrument panel or at the instrument panel.

Figure 2:
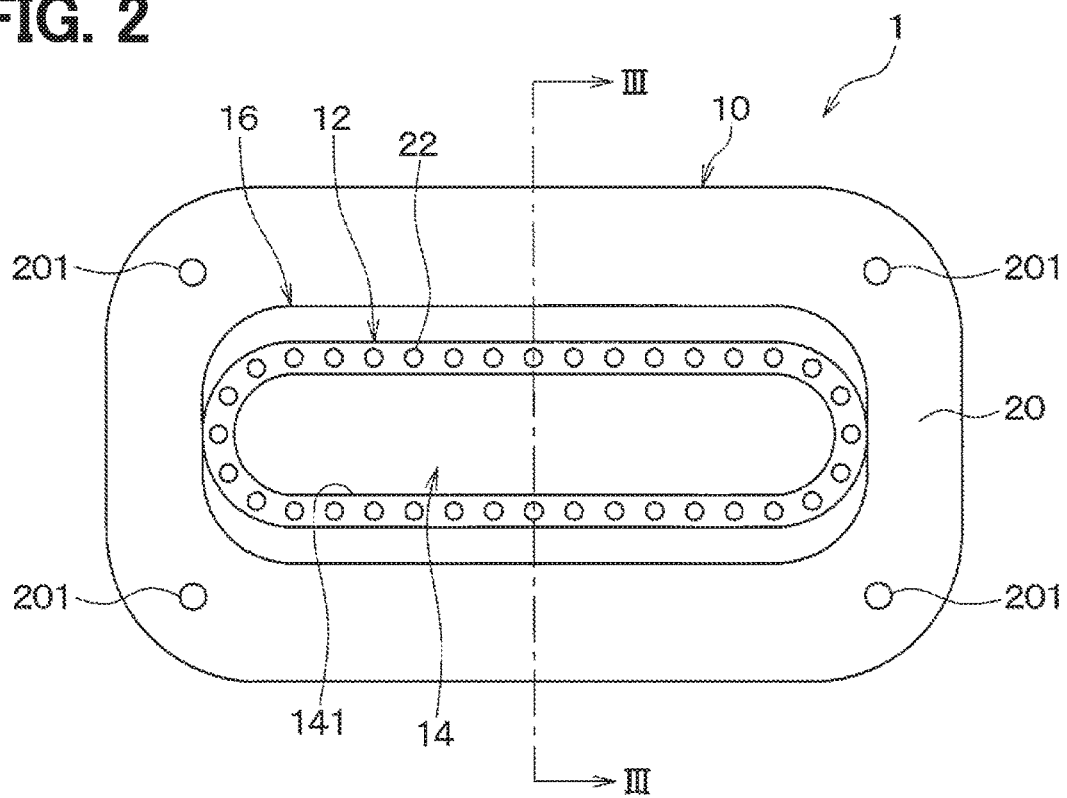
FIG. 2 is a schematic front view of the air discharge device according to the first embodiment.

As shown in FIGS. 1 and 2, the air discharge device 1 includes an air discharge unit 10 for discharging an air flow. The air discharge unit 10 defines an air passage therein, which guides an air flow adjusted to a desired temperature by the air conditioning unit into the interior of the passenger compartment. The air discharge unit 10 is configured to include a duct 16, a hole forming member 12 that forms a main hole 14 from which an air flow as a working air flow is discharged, and a flange 20 that is provided outside the duct 16.

The duct 16 is a member that define a flow passage through which an air flow to be blown into the interior of the passenger compartment passes. The duct 16 is made of a tubular member, for example. The duct 16 has a flat shape in which a horizontal dimension is larger than a vertical dimension when viewed from an air flow direction. Further, the duct 16 has a shape that is narrowed along the air flow direction from an upstream side toward a downstream side.

Figure 3:
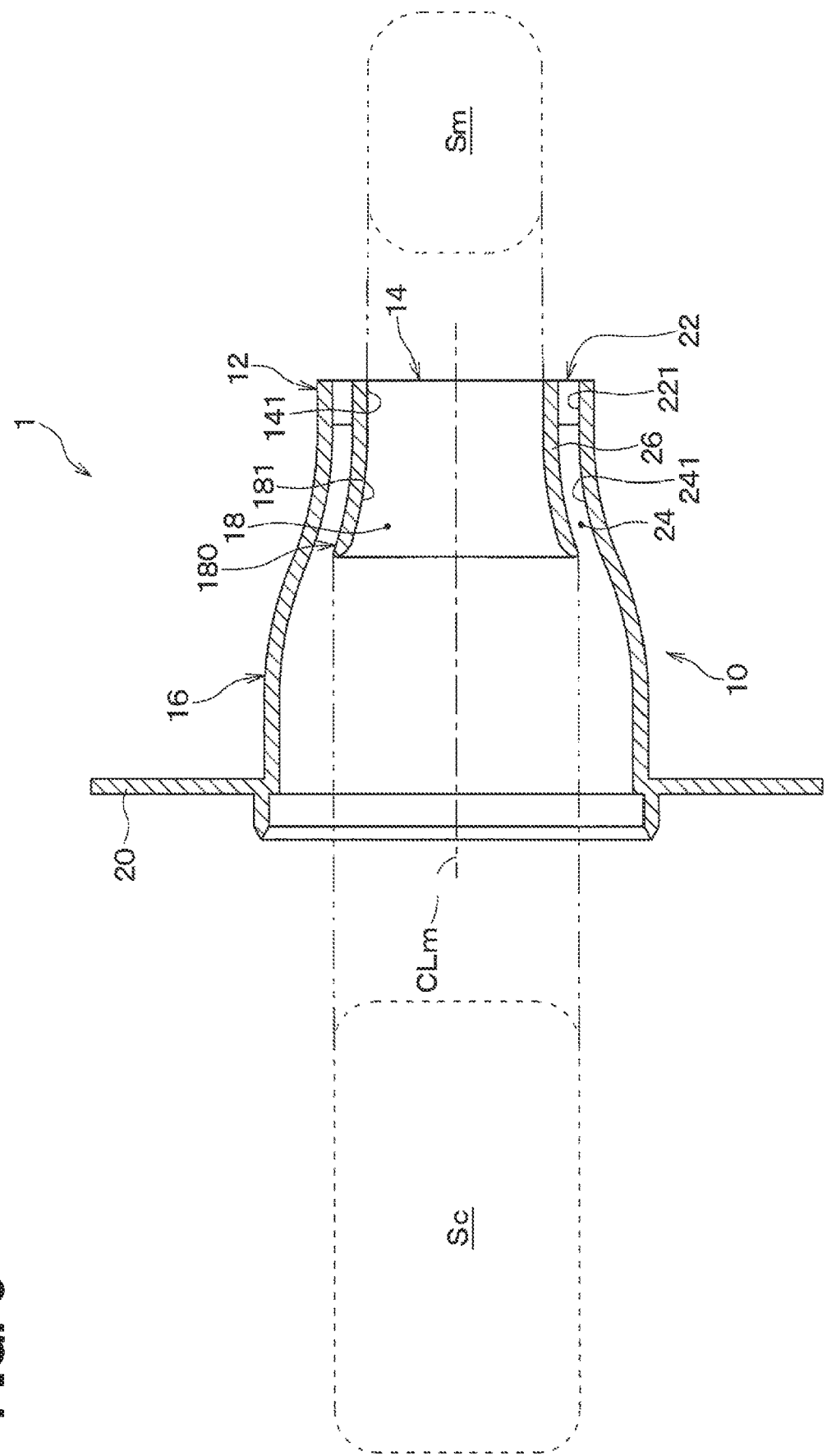
FIG. 3 is a cross-sectional view taken along III-III line in FIG. 2.

As shown in FIG. 3, a partition portion 26 is provided inside the duct 16 in an area nearer a downstream position than an upstream portion. The partition portion 26 is formed in a tubular shape, and is arranged inside the duct 16 so that a predetermined gap is formed between the partition portion 26 and the duct 16. Inside the duct 16, an inner flow passage and an outer flow passage are formed by the partition portion 26. That is, the duct 16 has a double flow structure by disposing the partition portion 26 inside thereof.

Inside the duct 16, a main flow passage 18 is formed in a central area thereof. The main flow passage 18 is formed by a space inside the partition section 26. The main flow passage 18 is a flow path through which a working air flow to be blown from the main hole 14 described later passes.

In addition, an auxiliary flow passage 24 is formed inside the duct 16 and outside the main flow passage 18. The auxiliary flow passage 24 is formed by the gap formed between the partition portion 26 and the duct 16. The auxiliary flow passage 24 is a flow path through which a support air flow to be blown from auxiliary holes 22 passes.

The main flow passage 18 and the auxiliary flow passage 24 are partitioned by the partition portion 26 described above. The main flow path 18 and the auxiliary flow path 24 communicate with each other at the upstream side portion of the duct portion 16.

The duct 16 is fitted into an air outlet of an air conditioning unit (not shown), at an upstream position of the duct 16 in an air flow direction. Further, the duct 16 has a downstream portion in the air flow direction, connected to an outer periphery of the hole forming member 12.

The hole forming member 12 is positioned at a downstream end of the duct 14 in the air flow direction. The hole forming member 12 is a plate-shaped member that configures a downstream end surface of the duct 16 at the downstream air side, and has a predetermined thickness in the air flow direction. The hole forming member 12 is also used as a connector that connects the duct 16 and the partition portion 26 to each other at a downstream end area. The hole forming member 12 is formed in a tubular shape so that air can be blown out. The hole forming member 12 has a flat shape in which a horizontal dimension is larger than a vertical dimension when viewed from the air flow direction. The main hole 14 is opened as a single hole in a central portion of the hole forming member 12. The main hole 14 is an open hole for blowing conditioned air, the temperature of which is adjusted by the air conditioning unit, into the passenger compartment as a working air flow.

The main hole 14 has an oval shape with a horizontal dimension larger than a vertical dimension when viewed from the air flow direction. Specifically, the main hole 14 has a shape in which parallel line segments having the same length are connected by a pair of curved curves curved in an arc shape.

The main hole 14 is an outlet communicating with the main flow passage 18. The main hole 14 is provided in a range from the downstream end of the partition portion 26 to an upstream position by the thickness of the hole forming member 12, in an air flow direction. The main hole 14 has an inner wall surface 141 extending along the air flow direction.

Further, in the hole forming member 12, a plurality of auxiliary holes 22 are formed to surround a periphery of the main hole 14. The auxiliary hole 22 is an open hole for blowing out a support air flow configured to suppress a suction action of air drawn by the working air flow discharged from the main hole 14.

As shown in FIG. 2, a plurality of auxiliary holes 22 are formed in the hole forming member 12 to surround the main hole 14. The plurality of auxiliary holes 22 are formed in the hole forming member 12 at a position outside of the outer edge of the main hole 14. The plurality of auxiliary holes 22 are formed so that the intervals between adjacent auxiliary holes 22 are equal. The plurality of auxiliary holes 22 are formed as round holes having a smaller cross-sectional area than that of the main hole 14.

The auxiliary holes 22 are holes communicating with the auxiliary flow passage 24. The auxiliary holes 22 are provided in a range from the downstream end of the partition portion 26 and the duct 16 to an upstream position by the thickness of the hole forming member 12, in the air flow direction. The auxiliary hole 22 has an inner wall surface 221 extending along the air flow direction.

The flange 20 is a member for attaching the air discharge unit 10 to an instrument panel (not shown). The flange 20 is a rectangular member provided on an outer periphery of the duct 16 to project outside from the duct 16. The flange 20 is attached to the instrument panel by a connecting member such as a screw, in a state where an upstream side portion of the duct 16 is fitted into the air outlet of the air conditioning unit. The flange 20 is provided with through holes 201 through which a connecting member such as a screw is inserted in the vicinity of the four corners.

Each of the hole forming member 12, the duct 16, the flange 20, and the partition portion 26 that configure the air discharge unit 10 is made of resin. The hole forming member 12, the duct 16, the flange 20 and the partition portion 26 are formed as an integrally molded product that is integrally molded by a molding technique such as an injection molding. However, the hole forming member 12, the duct 16, the flange 20 and the partition portion 26 may be partly configured separately. The air discharge unit 10 configured as described above is installed in the instrument panel (not shown) as described above.

Generally, the instrument panel is required to be miniaturized in a vehicle up-down direction from the viewpoint of the design and the expansion of the vehicle interior space. In addition, in the instrument panel, a large-sized information device, for informing various information showing a driving state of the vehicle or the like to an occupant, tends to be installed in a central portion in the vehicle width direction or/and a portion facing the occupant in the vehicle front-rear direction. In the air conditioning unit, it is necessary to take measures such as thinning the air outlet. However, when the air outlet is made thin, a core portion of the air flow blown from the air outlet is easily disturbed by a lateral vortex Vt generated downstream of the air outlet, and a reaching distance of the air flow reaching into the passenger compartment becomes shorter. Therefore, the air discharge device 1 is required to increase the reaching distance of the air flow blown into the vehicle compartment.

The inventors of the present disclosure have deeply studied the air suction action of the air flow when the air flow is blown out from the main hole 14, in order to further increase the reaching distance of the air flow blown into the passenger compartment. As a result, it was found that the air suction action is caused by a lateral vortex Vt generated by a shear force due to a velocity gradient of the working air flow when the working air flow is blown from the main hole 14. Hereinafter, the air suction action will be described with reference to FIGS. 4 and 5.

Figure 4:
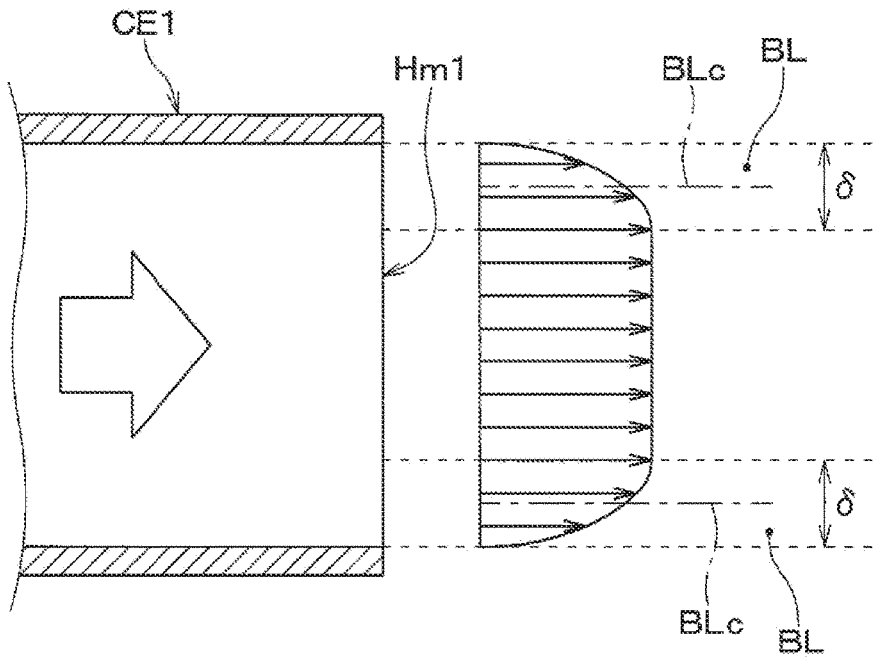
FIG. 4 is a diagram for explaining a velocity gradient of an air flow at a downstream area of a first nozzle, according to a first comparative example.

FIG. 4 is a schematic diagram showing a first nozzle CE1 that is a first comparative example, with respective to the air discharge device 1 of the present embodiment. The first nozzle CE1 is formed of a cylindrical tube having a substantially constant cross-sectional area, and the open at one end of the first nozzle CE1 forms a main hole Hm1.

As shown in FIG. 4, when the air flow is blown out from the main hole Hm1 of the first nozzle CE1, a difference in velocity between the air flow from the main hole Hm1 and the air that is stationary around the main hole Hm1 is caused downstream of the main hole Hm1. As a result, a velocity boundary layer BL is formed. The velocity boundary layer BL is a layer that is affected to stationary air, in the air flow blown from the main hole Hm1 of the first nozzle CE1.

Figure 5:
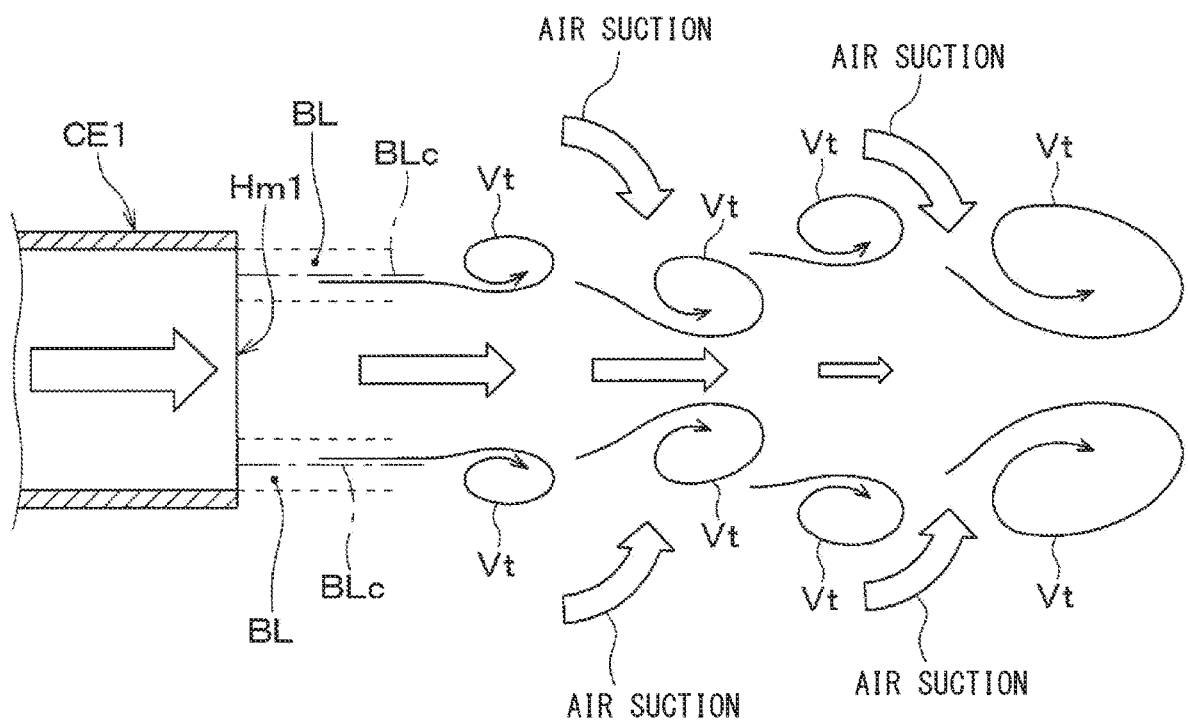
FIG. 5 is a diagram for explaining a state of an air flow at the downstream area of the first nozzle, according to the first comparative example.

In the velocity boundary layer BL, as shown in FIG. 5, an infinite number of lateral vortices Vt are generated by the shearing force due to the velocity gradient. According to the study by the present inventors, the infinite of lateral vortices Vt generated in the velocity boundary layer BL are synthesized near a central portion BLc of the thickness $\delta$ of the velocity boundary layer BL, and develops into a large-scale one, so that the air suction action is likely to become stronger.

Here, the thickness $\delta$ of the velocity boundary layer BL is defined as a dimension from the wall surface to a position where the velocity $U\infty$ of the main flow (that is, the potential flow) flowing inside the velocity boundary layer BL is 99% (that is, $0.99 \times U\infty$). The thickness $\delta$ of the velocity boundary layer BL is calculated, for example, based on the following formula F1.

$$\delta = 5 \times (v \times p/U\infty)^{1/2} \tag{F1}$$

In the formula F1, ν represents the kinematic viscosity coefficient, p represents the position of the main flow in the air flow direction, and U∞ represents the velocity of the main flow (that is, uniform flow velocity). As the definition equation of the thickness δ of the velocity boundary layer BL, other than the above-mentioned equation F1, for example, a definition equation based on the excluded thickness or a definition equation based on the momentum thickness can be used.

Figure 6:
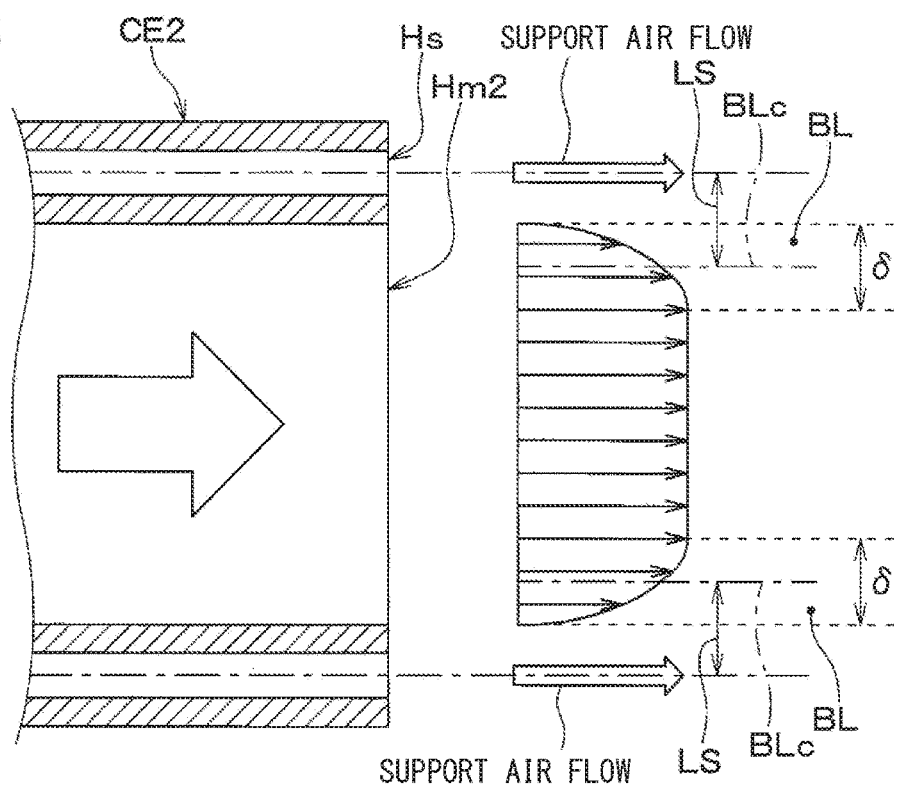
FIG. 6 is a diagram for explaining a velocity gradient of an air flow at a downstream area of a second nozzle, according to a second comparative example.

FIG. 6 is a schematic diagram showing a second nozzle CE2 that is a second comparative example, with respective to the air discharge device 1 of the present embodiment. The second nozzle CE2 is configured by a cylindrical tube having a main hole Hm2 and a plurality of auxiliary holes Hs surrounding the main hole Hm2 at one end side thereof. As shown in FIG. 6, when the air flow is blown out from the main hole Hm2 and the auxiliary holes Hs of the second nozzle CE2, the velocity boundary layer BL of the working air flow along the inner wall surface of the main hole Hm2 is formed downstream of the outlet of the main hole Hm2. It is considered that a lateral vortex Vt is likely to occur in the velocity boundary layer BL near the central portion BLc of the thickness δ.

On the other hand, the mainstream of the support air flow is blown out from the auxiliary hole Hs in parallel with the working air flow blown from the main hole Hm2, in a state with a predetermined distance LS from the central portion BLc of the thickness δ of the velocity boundary layer BL. That is, in the second nozzle CE2, the mainstream of the support air flow blown out of the auxiliary hole Hs flows in a state away from the central portion BLc of the thickness δ of the velocity boundary layer BL.

In such a case, because the mainstream of the support air flow is separated from the vortex center of the lateral vortex Vt generated in the velocity boundary layer BL, the lateral vortex Vt may be difficult to be effectively disturbed by the support air flow, and an effective suppression relative to the development of the lateral vortex Vt generated in the velocity boundary layer BL may be difficult to be obtained.

The inventors of the present disclosure found that the effect of suppressing the development of the lateral vortex Vt generated in the velocity boundary layer BL can be obtained by making the main stream of the support air flow to be closer to the vortex center of the lateral vortex Vt generated in the velocity boundary layer BL of the working air flow. In accordance with this, a vortex suppression structure is added to the air discharge device 10. This vortex suppression structure is also a separation structure for separating the velocity boundary layer BL of the working air flow from the central portion of the working air flow.

As shown in FIG. 3, in the air discharge portion 10 of the present embodiment, as the vortex suppression structure, an enlarged portion 180 having a cross-sectional area Sc larger than the open area Sm of the main hole 14 is provided with respect to the main flow passage 18 of the duct 16.

The inner wall surface 181 of the partition portion 26 defining the main flow passage 18 has a shape in which the wall surface is tapered from the position of the enlarged portion 180 having the largest cross-sectional area toward the main hole 14. The enlarged portion 180 is configured in a range of the inner wall surface 181 of the partition portion 26 defining the main flow passage 18, in which the cross-sectional area of the inner wall surface 181 decreases from the upstream side to the downstream side in the air flow direction. For example, the enlarged portion 180 has a cross-sectional area that continuously decreases as toward the main hole 14, so as to be continuously connected to the main hole 14. The enlarged portion 180 is set such that a ratio of the maximum sectional area Sc to the open area Sm of the main hole 14 is, for example, 7:2. The cross-sectional area Sc of the enlarged portion 180 is the cross-sectional area at the position where the passage cross-sectional area is largest in the main flow passage 18. Specifically, the cross-sectional area Sc of the enlarged portion 180 is the cross-sectional area at the upstream end of the partition portion 26 the air flow direction. The opening area Sm of the main hole 14 is the cross-sectional area of the end portion of the partition portion 26 on the downstream side of the air flow.

Figure 7:
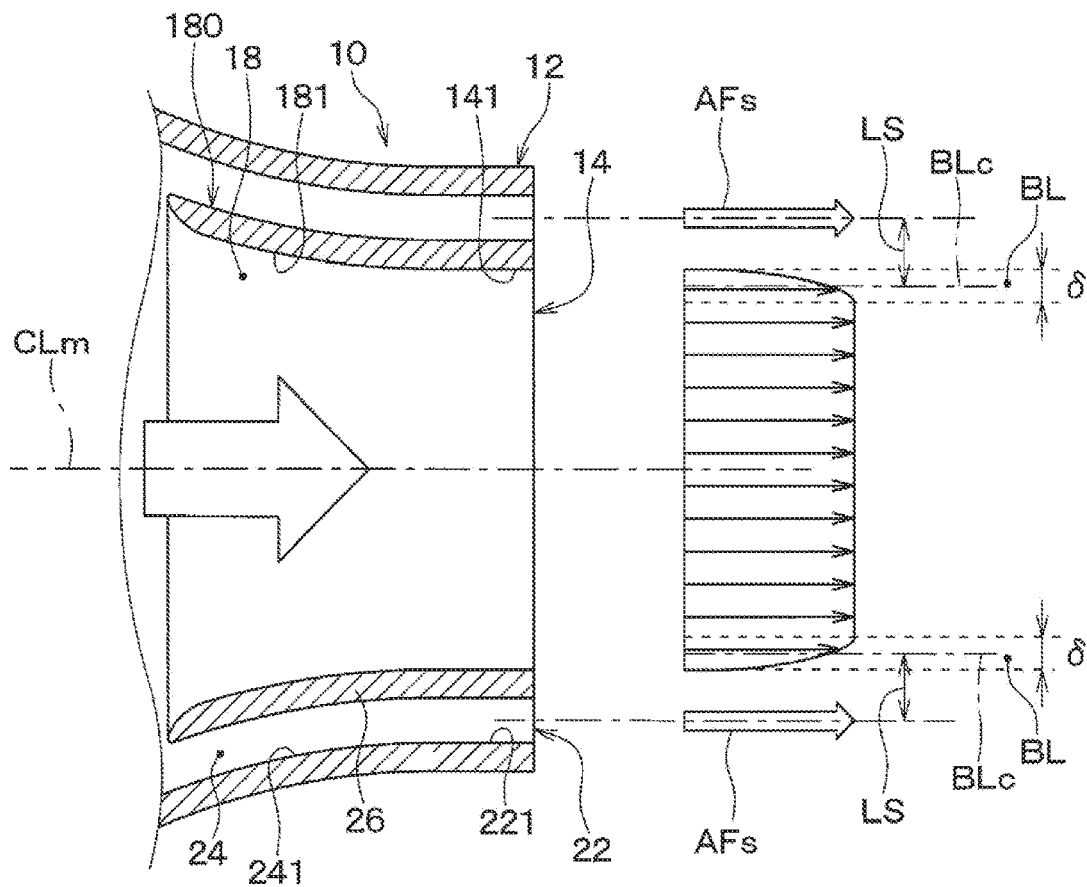
FIG. 7 is a diagram for explaining a velocity gradient of a working air flow at a downstream area of a main hole of the air discharge device, according to a first embodiment.
Figure 8:
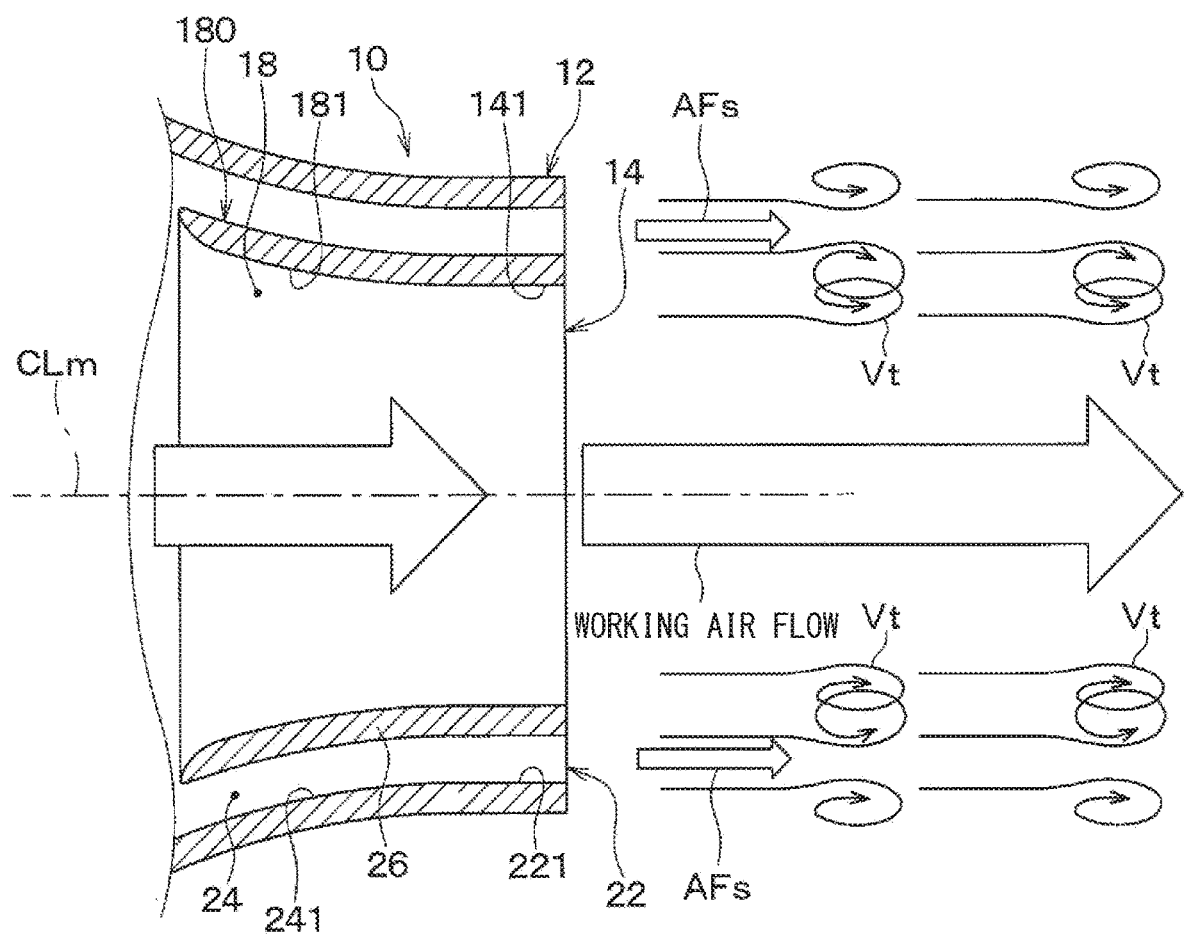
FIG. 8 is a diagram for explaining a state of the working air flow at the downstream area of the main hole of the air discharge device, according to a first embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 7.

Since the main flow passage 18 is provided with the enlarged portion 180 having a cross-sectional area Sc larger than the open area Sm of the main hole 14, a contraction flow is generated from the enlarged portion 180 to the main hole 14. As a result, in the main flow passage 18, a flow velocity difference between the vicinity of the center line CLm of the main hole 14 and the vicinity of the inner wall surface 181 defining the main flow passage 18 becomes small. The reason why the flow velocity of the air flow near the inner wall surface 181 defining the main flow passage 18 becomes higher is that a centrifugal force acts on the air flow along the inner wall surface 181 due to the action of the curvature of the inner wall surface 181 defining the main flow passage 18. The contraction flow is a phenomenon in which the difference between the flow velocity near the wall surface of the flow passage and the flow velocity of the main flow is reduced by reducing the flow passage cross section.

When the air flow is blown from the main hole 14 and the auxiliary hole 22, a velocity boundary layer BL of the working air flow is formed along the inner wall surface 141 of the main hole 14 at a downstream side of the outlet of the main hole 14. The thickness δ of the velocity boundary layer BL becomes smaller than that in the second comparative example due to the contraction flow in the main flow passage 18.

If the thickness δ of the velocity boundary layer BL of the working air flow formed downstream of the outlet of the main hole 14 is small, the central portion BLc of the thickness δ of the velocity boundary layer BL becomes closer to the mainstream of the support air flow blown out from the auxiliary hole 22 at the downstream side of the outlet of the main hole 14. That is, in the air discharge unit 10 of the present embodiment, the mainstream AFs of the support air flow blown out of the auxiliary hole 22 flows in a state of approaching the central portion BLc of the thickness δ of the velocity boundary layer BL. Specifically, a lateral distance LS between the mainstream of the support air flow and the central portion BLc of the thickness δ of the velocity boundary layer BL is smaller than that in the second comparative example.

In such a case, because the mainstream of the support air flow is closer to the vortex center of the lateral vortex Vt generated in the velocity boundary layer BL, the lateral vortex Vt can be easily disturbed by the support air flow, and a suppression relative to the development of the lateral vortex Vt generated in the velocity boundary layer BL can be effectively obtained.

As described above, in the air discharge device 1 of the present embodiment, it is possible to suppress the development of the lateral vortex Vt generated in the velocity boundary layer BL on the downstream side of the outlet of the main hole 14 by the enlarged portion 180 provided in the main flow passage 18. In the present embodiment, the enlarged portion 180 provided in the main flow passage 18 functions as a vortex suppression structure. More specifically, the enlarged portion 180 functions as a layer reduction structure that reduces the thickness δ of the velocity boundary layer BL formed along the inner wall surface 141 of the main hole 14.

In the air discharge device 1 described above, the vortex suppression structure is realized by the enlarged portion 180 provided in the main flow passage 18. According to this, the air stream blown from the central portion BLc of the thickness δ of the velocity boundary layer BL formed downstream of the outlet of the main hole 14 and the air stream blown from the auxiliary holes 22 are closer to each other at the downstream side of the outlet of the main hole 14. That is, if the main channel 18 is provided with the enlarged portion 180, the flow contraction is caused near the main hole 14, thereby reducing the difference in flow velocity between the center line CLm of the main hole 14 and the inner wall surface 141, and reducing the thickness δ of the velocity boundary layer BL formed downstream of the outlet of the main hole 14.

As a result, the development of the lateral vortex Vt in the velocity boundary layer BL can be sufficiently suppressed by the support air flow blown out from the auxiliary hole 22. As a result, the air suction from the surroundings of the working air flow blown out of the main hole 14 is suppressed, and attenuation of the flow velocity of the working air flow blown out of the main hole 14 can be reduced. Therefore, the reaching distance of the working air flow discharged from the main hole 14 can be made longer.

In particular, when the conditioned air whose temperature has been adjusted by the air conditioning unit is blown out of the main hole 14 as the working air flow, it is possible to suppress the air suction from the surroundings into the working air flow blown out of the main hole 14, thereby reducing a temperature change of the working air flow due to the air suction. Thus, according to the air discharge device 1 of the present embodiment, it is possible to make the air stream having an appropriate temperature can reach a desired location in the passenger compartment. This is particularly effective in realizing spot air conditioning in the passenger compartment. In the present embodiment, the enlarged portion 180 provided in the main flow passage 18 functions as the separation structure for separating the velocity boundary layer BL of the working air flow from the central portion of the working air flow.

Second Embodiment

Next, a second embodiment will be described with reference to FIGS. 9 to 12. The present embodiment is different from the first embodiment in that a contraction fin 28 configured to contract an air flow flowing through a main flow passage 18 is provided inside the duct 6. In the present embodiment, a difference part different from the first embodiment will be mainly described, and description for a part similar to the first embodiment will be omitted.

Figure 9:
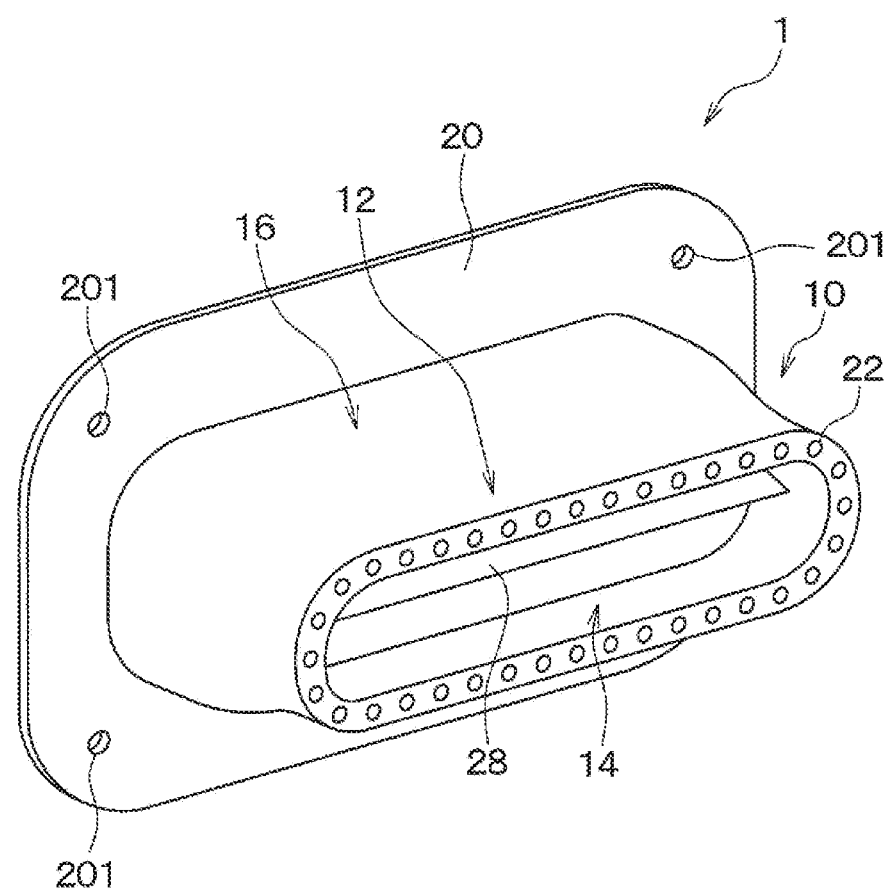
FIG. 9 is a schematic perspective view of an air discharge device according to a second embodiment.
Figure 10:
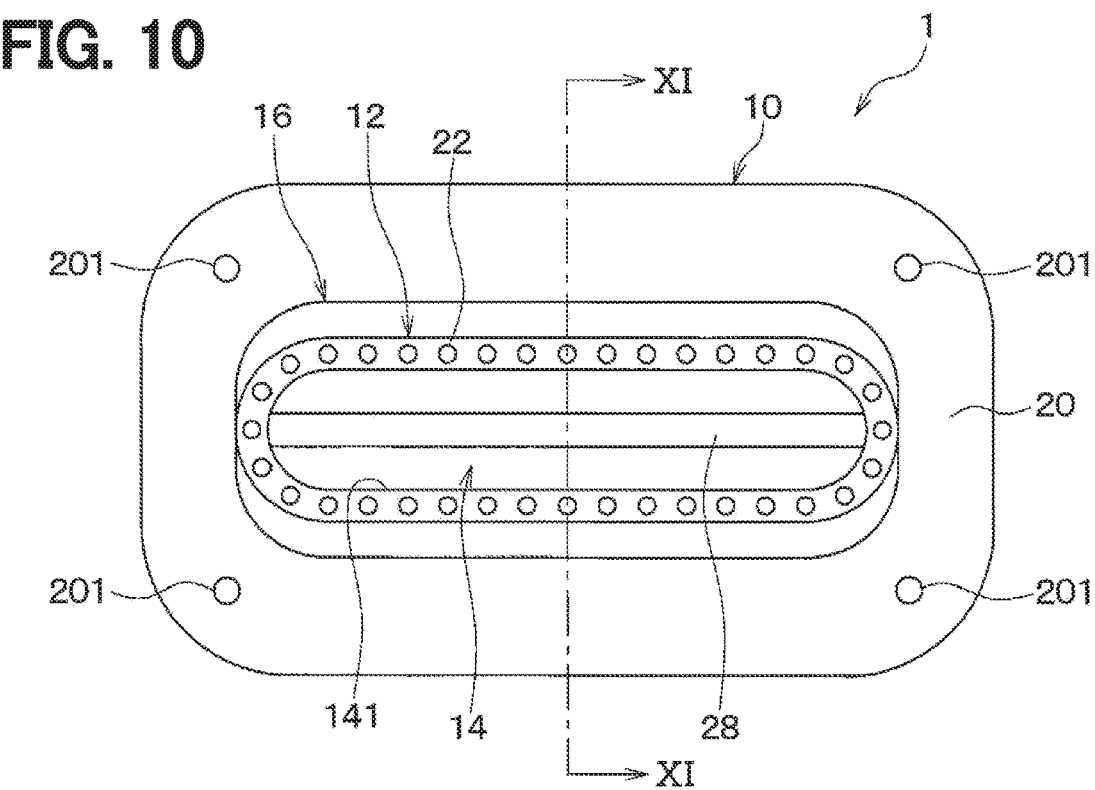
FIG. 10 is a schematic front view of the air discharge device according to the second embodiment.

As shown in FIG. 9, the contraction fin 28 is provided inside the duct 16 in the air discharge unit 10 of the present embodiment. As shown in FIG. 10, the contraction fin 28 is provided in the central portion of the short edge sides of the inner wall surface 141 of the main hole 14 to extend in a direction parallel to the long edge sides of inner wall surface of the main hole 14, so that the main flow passage 18 formed inside of the duct 16 is divided into an upper part and a lower part. Although not shown, two ends of the contraction fin 28 in a longitudinal direction of the contraction fin 28 are connected to the inside of the duct 16. The contraction fin 28 is also a structure that contracts the air flow passing through the main flow path 18 as a layer contraction structure.

Figure 11:
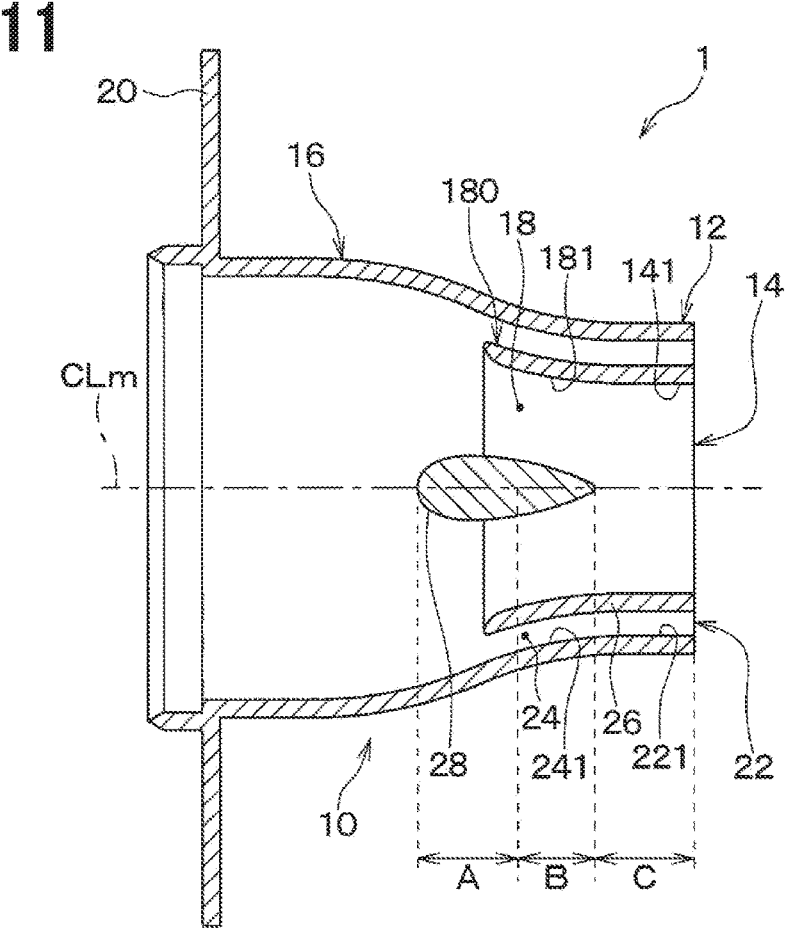
FIG. 11 is a cross-sectional view taken along line XI-XI in FIG. 10.

As shown in FIG. 11, the contraction fin 28 is positioned in a portion forming the main flow passage 18 inside the duct 16 so as not to protrude outside from the main hole 14. Specifically, the contraction fin 28 is located inside the duct 16 at a position overlapping a part of the partition portion 26 and without overlapping with the wall surface 141, in the direction perpendicular to the center line CLm of the main flow passage 18.

The cross section of the contraction fin 28 has a teardrop shape with excellent aerodynamic characteristics. That is, the front edge portion of the contraction fin 28 positioned at an upstream area of the air flow has a rounded curved surface, and the rear edge portion thereof positioned at a downstream area of the air flow has a sharp curved surface as compared with the front edge portion. Further, the contraction fin 28 has a maximum cross-sectional thickness at a position closer to the front edge portion than to the rear edge portion.

Figure 12:
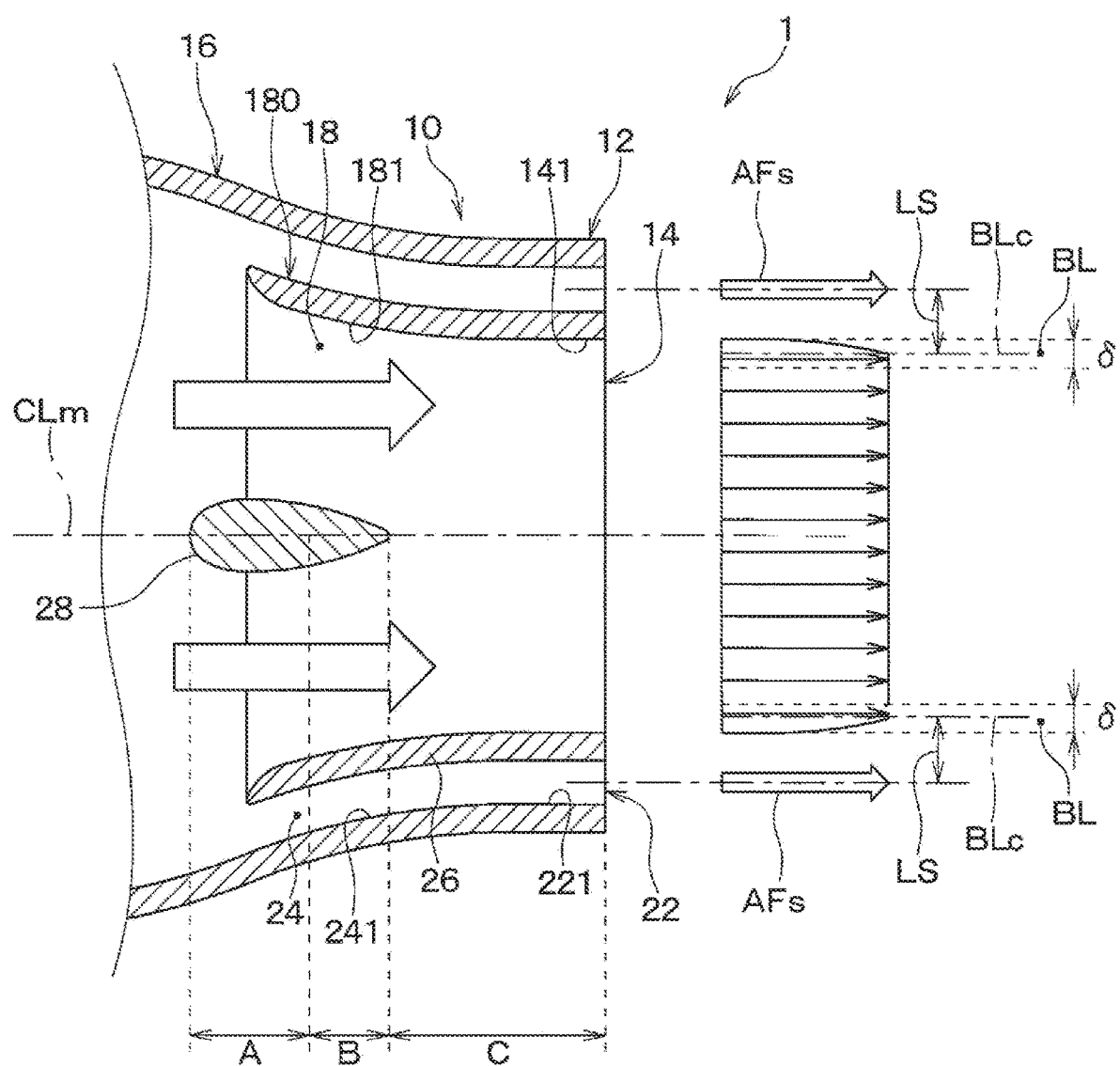
FIG. 12 is a diagram for explaining a velocity gradient of a working air flow at a downstream area of a main hole of the air discharge device, according to the second embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 12.

Since the main flow passage 18 is provided with the enlarged portion 180 having a cross-sectional area Sc larger than the open area Sm of the main hole 14, a contraction flow is generated from the enlarged portion 180 to the main hole 14. In addition, the main flow passage 18 is branched by the contraction fin 28, so that a contraction flow is generated before reaching the main hole 14.

As described above, the contraction fin 28 is positioned in a portion forming the main flow passage 18 inside the duct 16 so as not to protrude outside from the main hole 14. Therefore, the duct 16 is provided therein with an upstream section A in which the flow passage cross-sectional area is reduced by the contraction fin 28, an intermediate section B in which the flow passage cross-sectional area is enlarged by the contraction fin 28 compared to the upstream section A, and a downstream section C in which the flow passage cross-sectional area is almost not changed.

In the upstream section A, the flow passage cross-sectional area is reduced by the contraction fin 28, and the air flow is compressed, so that the flow velocity between the vicinity of the center line CLm of the main hole 14 and the vicinity of the inner wall surface 181 forming the main flow passage 18 is made sufficiently small. Thus, in the upstream section A, the thickness δ of the velocity boundary layer BL near the inner wall surface 181 defining the main flow passage 18 decreases as toward the downstream side due to the contraction flow effect of the contraction fin 28.

On the other hand, in the intermediate section B and the downstream section C, which are on the downstream side of the upstream section A, because the flow passage cross-sectional area is not small as toward downstream, the thickness δ of the velocity boundary layer BL near the inner wall surface 181 defining the main flow passage 18 becomes larger as toward downstream.

Specifically, in the intermediate section B that is a downstream side of the upstream section A, because the flow passage cross-sectional area is enlarged, the thickness δ of the velocity boundary layer BL near the inner wall surface 181 defining the main flow passage 18 gradually increases as toward the downstream side. However, in the contraction fin 28, the amount of change in the thickness of the cross section on the rear edge side positioned at the downstream side of the air flow is smaller than that on the front edge side. Therefore, the change in the flow passage cross-sectional area in the intermediate section B becomes slower than the change in the upstream section A, and the increase amount of the thickness δ of the velocity boundary layer BL in the intermediate section B is sufficiently smaller than the amount of decrease in the thickness δ in the upstream section A.

Further, in the downstream section C which is the downstream side of the intermediate section B, because the flow passage cross-sectional area is constant, the thickness δ of the velocity boundary layer BL near the inner wall surface 181 defining the main flow passage 18 slightly increases as toward the downstream side. However, the increase amount of the thickness δ of the velocity boundary layer BL in the downstream section C is extremely smaller than the decrease amount of the thickness δ of the velocity boundary layer BL in the upstream section A.

As described above, the reduction amount of the thickness δ of the velocity boundary layer BL in the upstream section A by the contraction fin 28 is sufficiently larger than the total increase amount of the thickness δ of the velocity boundary layer BL in the intermediate section B and the downstream section C.

As a result, in the main flow passage 18, a flow velocity difference between the vicinity of the center line CLm of the main hole 14 and the vicinity of the inner wall surface 181 defining the main flow passage 18 becomes sufficiently small. When the air flow is blown from the main hole 14 and the auxiliary hole 22, a velocity boundary layer BL of the working air flow is formed along the inner wall surface 141 of the main hole 14 at a downstream side of the outlet of the main hole 14. In this case, the thickness δ of the velocity boundary layer BL can be smaller than that in the first embodiment.

That is, in the air discharge unit 10 of the present embodiment, the mainstream AFs of the support air flow blown out of the auxiliary hole 22 flows in a state of approaching the central portion BLc of the thickness δ of the velocity boundary layer BL. In such a case, because the mainstream of the support air flow is closer to the vortex center of the lateral vortex Vt generated in the velocity boundary layer BL, the lateral vortex Vt can be disturbed by the support air flow, and a suppression relative to the development of the lateral vortex Vt generated in the velocity boundary layer BL can be effectively obtained. In the present embodiment, the enlarged portion 180 and the contraction fin 28 provided in the main flow passage 18 functions as a vortex suppression structure. More specifically, the enlarged portion 180 and the contraction fin 28 function as a layer reduction structure that reduces the thickness δ of the velocity boundary layer BL formed along the inner wall surface 141 of the main hole 14.

Although the air discharge device 1 of the present embodiment described above has the contraction fin 28 added to the main flow passage 18, the other configurations are common to the first embodiment. For that reason, the air discharge device 1 according to the present embodiment can obtain the same advantages as those in the first embodiment, from the configuration in common with the first embodiment.

In particular, in the present embodiment, the layer reduction structure includes not only the enlarged portion 180 but also the contraction fin 28. According to this, it is possible to reduce the thickness δ of the velocity boundary layer BL due to the contraction flow while suppressing the increase in the size of the device due to the expansion of the main flow passage 18. Such a configuration is suitable when an installation space is greatly limited, for example in a moving body such as a vehicle. In the present embodiment, the enlarged portion 180 and the contraction fin 28 provided in the main flow passage 18 functions as the separation structure for separating the velocity boundary layer BL of the working air flow from the central portion of the working air flow.

Modification to the Second Embodiment

In the above-described second embodiment, the contraction fin 28 has a teardrop shape in cross section, but the present disclosure is not limited to this. The contraction fin 28 may have, for example, an oval shape whose cross-sectional shape extends along the air flow of the main flow passage 18. Moreover, as the contraction fin 28, for example, a member having a lattice shape may be adopted.

In the above-described second embodiment, an example in which the enlarged portion 180 is provided in the main flow passage 18 has been described, but the present disclosure is not limited to this. The air outlet device 1 may have a configuration in which only the contraction fin 28 is arranged with respect to the main flow passage 18 and the enlarged portion 180 may be not provided with respect to the main flow passage 18. In this case, the contraction fin 28 functions as the layer reduction structure configured to reduce the thickness δ of the velocity boundary layer BL formed along the inner wall surface 141 of the main hole 14.

Third Embodiment

Next, a third embodiment will be described with reference to FIGS. 13 to 15. The present embodiment is different from the first embodiment in that an uneven portion 30 is provided on the inner wall surface 181 defining the main flow passage 18. In the present embodiment, a difference part different from the first embodiment will be mainly described, and description for a part similar to the first embodiment will be omitted.

Figure 13:
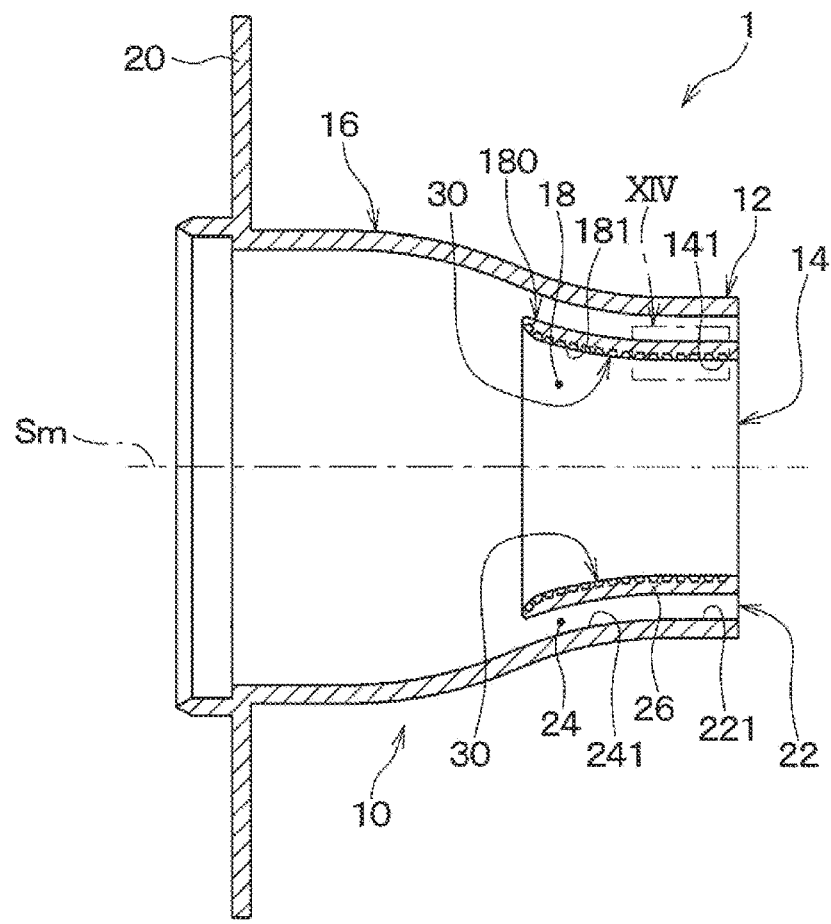
FIG. 13 is a schematic sectional view of an air discharge device according to a third embodiment.

As shown in FIG. 13, in the air discharge unit 10 of the present embodiment, the uneven portion 30, in which concave portions and convex portions are alternately arranged on the inner wall surface 181 defining the main flow passage 18, is provided along the flow direction of the air in the main flow passage 18. Specifically, the uneven portion 30 is formed inside of the duct 16 in substantially in an entire area of an inner surface of the partition portion 26 that partitions the main flow passage 18 and the auxiliary flow passage 24 from each other.

Figure 14:
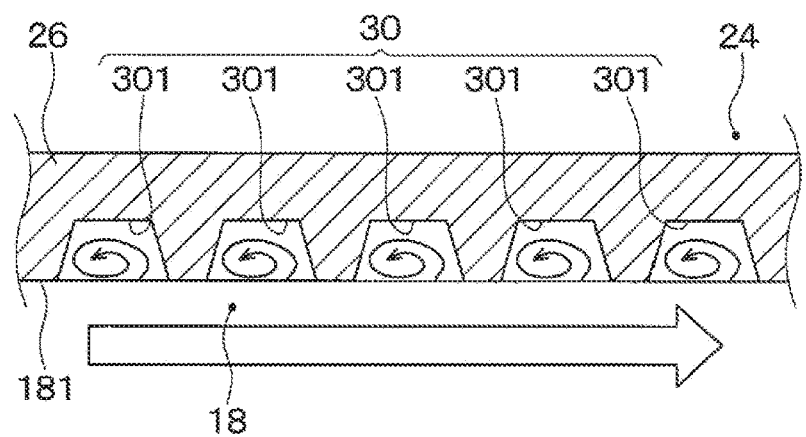
FIG. 14 is an enlarged view of a portion XIV in FIG. 13.

As shown in FIG. 14, the uneven portion 30 is configured by a plurality of grooves 301 provided on the inner wall surface 181 defining the main flow passage 18. The plurality of grooves 301 are arranged at a predetermined interval along the flow direction of the air flow in the main flow passage 18. The groove 301 is made of a circular or polygonal depression. In addition, the groove 301 may be configured by, for example, a slit groove having a V-shaped cross section that extends to intersect the flow direction of the air flow in the main flow passage 18.

Figure 15:
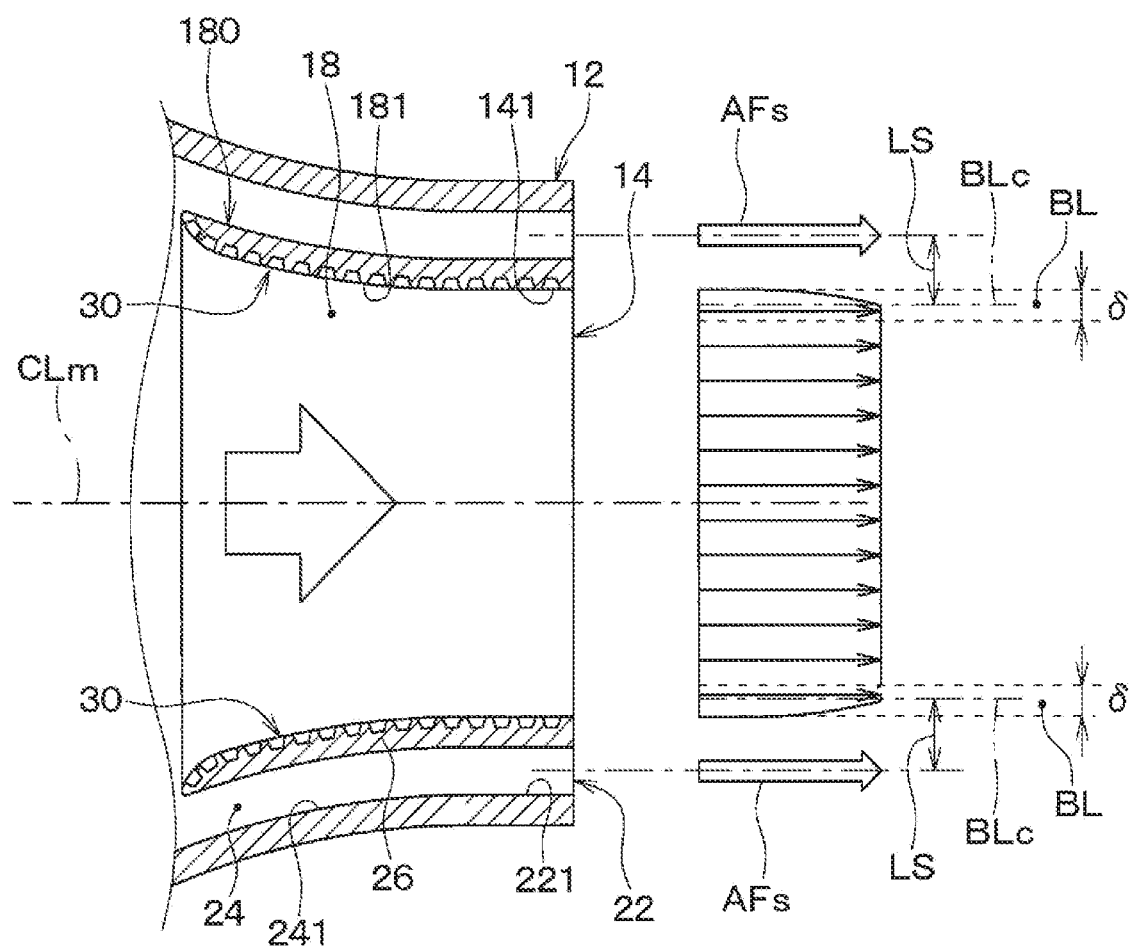
FIG. 15 is a diagram for explaining a velocity gradient of a working air flow at a downstream area of a main hole of the air discharge device, according to the third embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 15.

Since the main flow passage 18 is provided with the enlarged portion 180 having a cross-sectional area Sc larger than the open area Sm of the main hole 14, a contraction flow is generated from the enlarged portion 180 to the main hole 14. In addition, the inner wall surface 181 defining the main flow passage 18 is provided with the uneven portion 30 in which the concave portions and the convex portions are alternately arranged in the main flow direction of the main flow passage 18.

As shown in FIG. 14, the uneven portion 30 is configured to generate vortices within the plurality of grooves 301 when the airflow passes near the inner wall surface 181 forming the main flow passage 18. Because the vortex generated inside the uneven portion 30 plays a role of a ball bearing, the coefficient of friction of the inner wall surface 181 defining the main flow passage 18 becomes small. As a result, in the main flow passage 18, a flow velocity difference between the vicinity of the center line CLm of the main hole 14 and the vicinity of the inner wall surface 181 defining the main flow passage 18 becomes small.

When the air flow is blown from the main hole 14 and the auxiliary hole 22, a velocity boundary layer BL of the working air flow is formed along the inner wall surface 141 of the main hole 14 at a downstream side of the outlet of the main hole 14. The thickness δ of the velocity boundary layer BL becomes smaller than that in the first embodiment due to the reduction in the friction coefficient by the uneven portion 30.

That is, in the air discharge unit 10 of the present embodiment, the mainstream AFs of the support air flow blown out of the auxiliary hole 22 flows in a state of approaching the central portion BLc of the thickness δ of the velocity boundary layer BL. Specifically, a lateral distance LS between the mainstream of the support air flow and the central portion BLc of the thickness δ of the velocity boundary layer BL becomes smaller than that in the first embodiment. In such a case, because the mainstream of the support air flow is closer to the vortex center of the lateral vortex Vt generated in the velocity boundary layer BL, the lateral vortex Vt can be disturbed by the support air flow, and a suppression relative to the development of the lateral vortex Vt generated in the velocity boundary layer BL can be effectively obtained. In the present embodiment, the enlarged portion 180 and the uneven portion 30 provided in the main flow passage 18 functions as a vortex suppression structure. More specifically, the enlarged portion 180 and the uneven portion 30 function as a layer reduction structure that reduces the thickness δ of the velocity boundary layer BL formed along the inner wall surface 141 of the main hole 14.

Although the air discharge device 1 of the present embodiment described above has the uneven portion 30 provided on the inner wall surface 181 defining the main flow passage 18, the other configurations are common to the first embodiment. For that reason, the air discharge device 1 according to the present embodiment can obtain the same advantages as those in the first embodiment, from the configuration in common with the first embodiment.

In the present embodiment, the layer reduction structure includes not only the enlarged portion 180 but also the uneven portion 30. According to this, it is possible to sufficiently reduce the thickness δ of the velocity boundary layer BL by the effect of reducing the friction coefficient of the inner wall surface 181 defining the main flow passage 18 as well as the contraction effect of the enlarged portion 180.

In particular, in this embodiment, the uneven portion 30 is formed by the plurality of grooves 301 provided on the inner wall surface 181 of the main flow passage 18. According to this, the size of the main flow passage 18 can be secured, and the pressure loss in the main flow passage 18 can be reduced, as compared with a case where the uneven portion 30 is configured by a plurality of protrusions. This greatly contributes to the improvement of the reaching distance of the working air flow. In the present embodiment, the enlarged portion 180 and the uneven portion 30 provided in the main flow passage 18 functions as the separation structure for separating the velocity boundary layer BL of the working air flow from the central portion of the working air flow.

Modification of the Third Embodiment

In the above-described third embodiment, the uneven portion 30 is configured by the plurality of grooves 301, but the present disclosure is not limited to this. The uneven portion 30 may be formed by a plurality of protrusions, for example. When the uneven portion 30 is formed by a plurality of protrusions, vortices are generated in the gaps between the plurality of protrusions when the airflow passes near the inner wall surface 181 forming the main flow passage 18. Since this vortex plays a role of a ball bearing, the same effects as those of the above-described third embodiment can be obtained by this modification.

In the above-described third embodiment, the uneven portion 30 is formed inside of the duct 16 substantially in the entire area of the inner surface of the partition portion 26 that partitions the main passage 18 and the auxiliary passage 24 from each other, but the present disclosure is not limited to this. The uneven portion 30 may be formed in a part area of the inner surface of the partition portion 26.

In the above-described third embodiment, an example in which the enlarged portion 180 is provided in the main flow passage 18 has been described, but the present disclosure is not limited to this. The air discharge device 1 may have a configuration in which only the uneven portion 30 is arranged with respect to the main flow passage 18 but the enlarged portion 180 may be not provided with respect to the main flow passage 18. In this case, the uneven portion 30 functions as the layer reduction structure that reduces the thickness δ of the velocity boundary layer BL formed along the inner wall surface 141 of the main hole 14.

Further, in the above-described third embodiment, the structure including the enlarged portion 180 and the uneven portion 30 is illustrated as the layer reduction structure, but the layer reduction structure is not limited to this. The layer reduction structure may be, for example, a structure including the enlarged portion 180, the contraction fin 28 and the uneven portion 30, or a structure including the contraction fin 28 and the uneven portion 30.

Fourth Embodiment

Next, a fourth embodiment will be described with reference to FIGS. 16 to 18. The present embodiment is different from the first embodiment in that a main hole 14 is expanded in a trumpet shape. In the present embodiment, a difference part different from the first embodiment will be mainly described, and description for a part similar to the first embodiment will be omitted.

Figure 16:
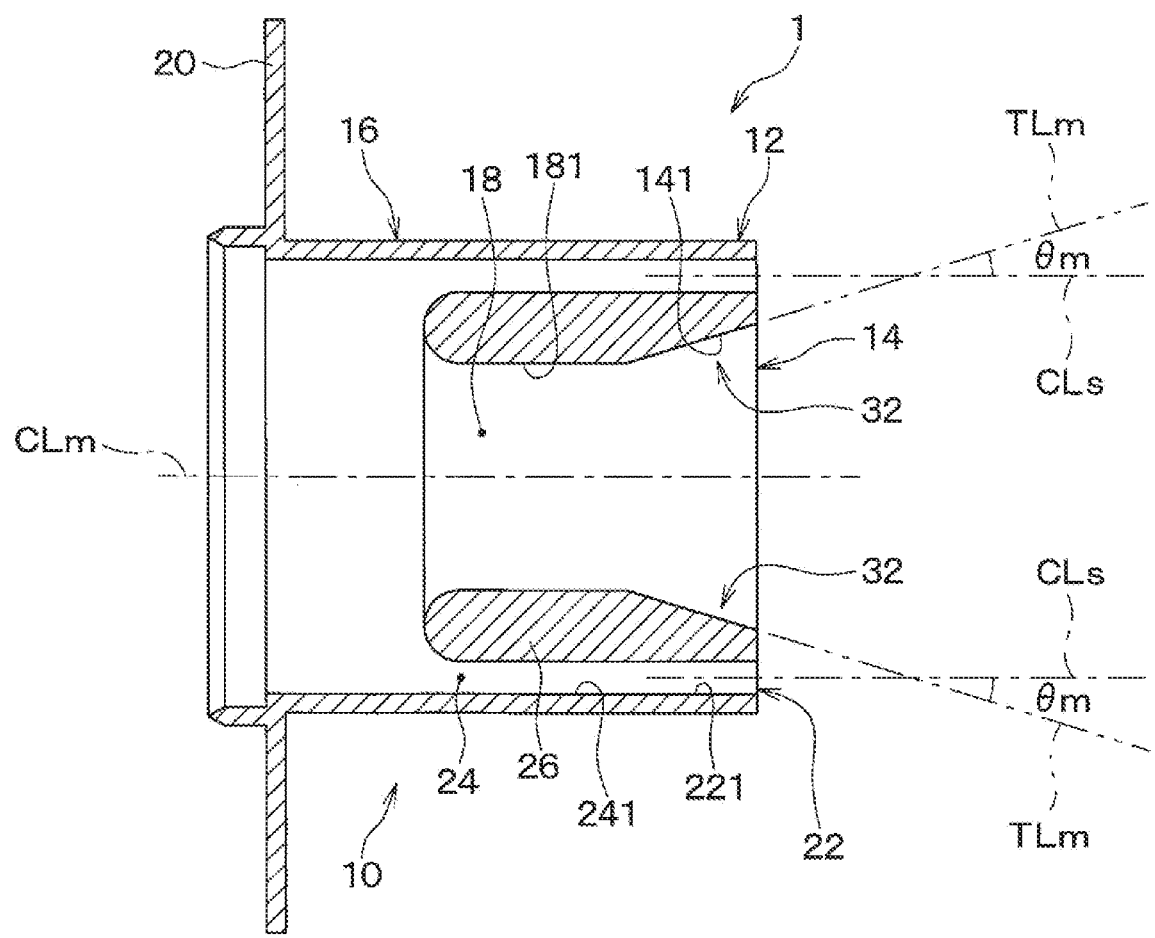
FIG. 16 is a schematic sectional view of an air discharge device according to a fourth embodiment.

As shown in FIG. 16, in an air discharge unit 10 of the present embodiment, the main hole 14 is expanded at a downstream side in a trumpet shape. Specifically, an inner wall surface 141 of the main hole 14 is provided with a main inclined structure 32 inclined with respect to the center line CLs of the auxiliary hole 22 such that a tangent line TLm extending along the inner wall surface 141 of the main hole 14 intersects with the center line CLs of the auxiliary hole 22 downstream of the outlet of the auxiliary hole 22. In other words, the inner wall surface 141 of the main hole 14 is inclined in a downstream area so that the tangent line TLm extending along the inner wall surface 141 intersects the center line CLm of the main hole 14 over the entire circumference. Specifically, the tangent line TLm is a tangent line extending along the inner wall surface 141 at a downstream end portion of the inner wall surface 141 of the main hole 14.

Here, in the velocity boundary layer BL formed on the downstream side of the outlet of the main hole 14, the lateral vortex Vt tends to start and generate at a position apart from the main hole 14, not immediately after the main hole 14. For example, the lateral vortex Vt may start to be generated at a position separated by at least twice the minor diameter of the main hole 14. Therefore, it is desirable that the inner wall surface 141 of the main hole 14 is set within a range where the angle θm formed by the tangent line TLm and the center line CLs is an acute angle (for example, within a range of 1° to 30°).

Further, in the air discharge unit 10 of the present embodiment, the cross-sectional area Sc of the main flow passage 18 at an upstream end is smaller than the open area Sm of the main hole 14. That is, the air discharge unit 10 of the present embodiment is not provided with a configuration corresponding to the enlarged portion 180 of the first embodiment. The cross-sectional area Sc of the main flow passage 18 is the cross-sectional area at the upstream end of the partition portion 26.

Figure 17:
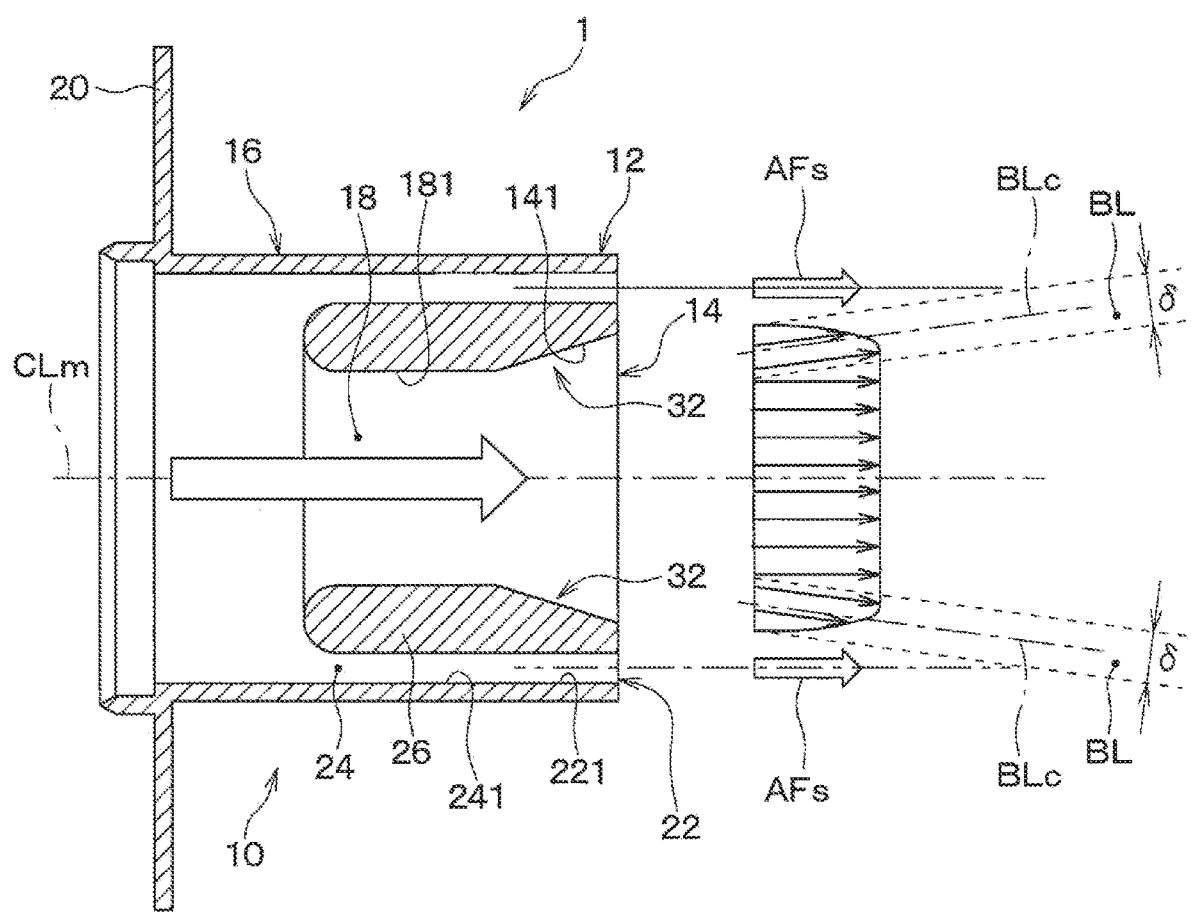
FIG. 17 is a diagram for explaining a velocity gradient of a working air flow at a downstream area of a main hole of the air discharge device, according to the fourth embodiment.
Figure 18:
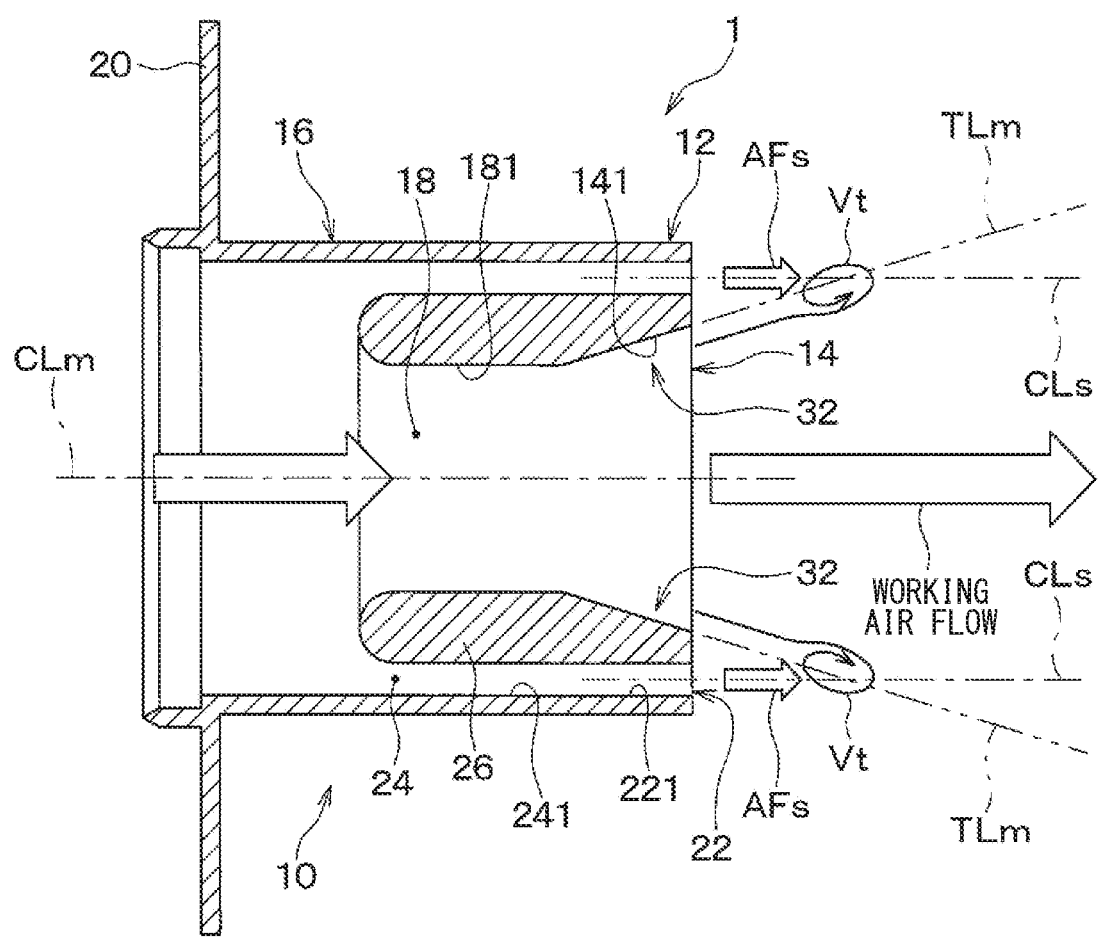
FIG. 18 is a diagram for explaining a state of the working air flow at the downstream area of the main hole of the air discharge device, according to the fourth embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 17. Then, the airstream flowing into the main flow passage 18 is blown out of the main hole 14. At this time, since the main hole 14 is expanded in a trumpet shape, a velocity boundary layer BL of the working air flow is formed downstream of the outlet of the main hole 14 to be separated from the center line CLm of the main hole 14. That is, at a downstream side of the outlet of the main hole 14, the central portion BLc of the velocity boundary layer BL of the working air flow approaches the mainstream of the support air flow blown out of the auxiliary hole 22.

That is, in the air discharge unit 10 of the present embodiment, the mainstream AFs of the support air flow blown out of the auxiliary hole 22 flows in a state of approaching the central portion BLc of the thickness δ of the velocity boundary layer BL. In such a case, because the mainstream of the support air flow is closer to the vortex center of the lateral vortex Vt generated in the velocity boundary layer BL, the lateral vortex Vt can be easily disturbed by the support air flow, and a suppression relative to the development of the lateral vortex Vt generated in the velocity boundary layer BL can be effectively obtained, as shown in FIG. 18. In the present embodiment, a main inclined structure 32 provided on the inner wall surface 141 of the main hole 14 functions as a vortex suppression structure.

In the air discharge device 1 of the present embodiment described above, the main inclined structure 32 is provided on the inner wall surface 141 forming the main hole 14. According to this, the flow velocity distribution near the inner wall surface 141 of the main hole 14 spreads to the support air flow discharged from the auxiliary hole 22 at a downstream side of the outlet of the main hole 14, and thus the central portion BLc of the thickness δ of the velocity boundary layer BL can be made closer to the support air flow discharged from the auxiliary hole 22 at a downstream side of the outlet of the main hole 14. As a result, the development of the lateral vortex Vt in the velocity boundary layer BL can be sufficiently suppressed by the support air flow blown out from the auxiliary hole 22.

In the air discharge device 1 of the present embodiment, the air suction from the surroundings of the working air flow blown out of the main hole 14 can be suppressed, and attenuation of the flow velocity of the working air flow blown out of the main hole 14 can be reduced. Therefore, the reaching distance of the working air flow discharged from the main hole 14 can be made longer. In the present embodiment, the main inclined structure 32 functions as the separation structure for separating the velocity boundary layer BL of the working air flow from the central portion of the working air flow.

Modification of Fourth Embodiment

In the above-described fourth embodiment, the inner wall surface 141 of the main hole 14 is inclined so that the tangent line TLm extending along the inner wall surface 141 intersects the center line CLm of the main hole 14, over the entire circumference. However, the present disclosure is not limited thereto. The air discharge device 1 may have a structure in which, for example, a portion of the inner wall surface 141 of the main hole 14 is inclined such that the tangent line TLm extending along the inner wall surface 141 intersects the center line CLm of the main hole 14.

In the above-described fourth embodiment, the inner wall surface 141 of the main hole 14 extends linearly, but the present invention is not limited to this. The inner wall surface 141 of the main hole 14 may extend in a curved shape. In this case, the tangent line TLm is a tangent line at a downstream end of the inner wall surface 141 of the main hole 14.

In the above-described fourth embodiment, the main inclined structure 32 is applied to the main hole 14, but the enlarged portion 180, the contraction fin 28, and the uneven portion 30 described in the first to third embodiments are not applied. However, the present disclosure is not limited to this. In the air discharge device 1, for example, at least one of the enlarged portion 180, the contraction fin 28, and the uneven portion 30 described in the first to third embodiments may be provided in the air discharge unit 10 in which the main inclined structure 32 is applied to the main hole 14.

Fifth Embodiment

Next, a fifth embodiment will be described with reference to FIGS. 19 and 20. The present embodiment is different from the first embodiment in that the auxiliary hole 22 is not provided in the hole forming member 12. In the present embodiment, a difference part different from the first embodiment will be mainly described, and description for a part similar to the first embodiment will be omitted.

Figure 19:
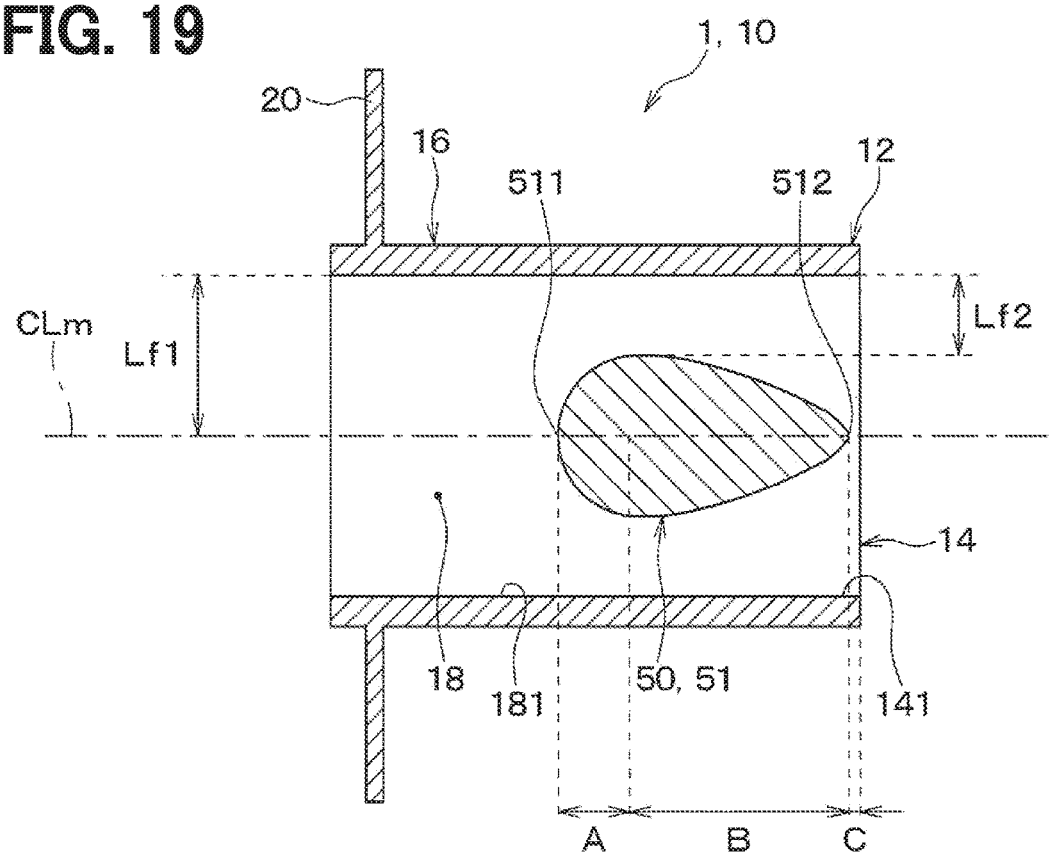
FIG. 19 is a schematic sectional view of an air discharge device according to a fifth embodiment.

As shown in FIG. 19, the air discharge device 1 includes an air discharge unit 10 for discharging an air flow. The air discharge unit 10 includes a hole forming member 12 that defines a main hole 14 from which an airstream as a working air flow is discharged, a duct 16 that defines a main flow passage 18 through which the working air flow to be discharged from the main hole 14 passes, and a flange 20 provided at an outside of the duct 16.

In the hole forming member 12 of the present embodiment, the main hole 14 having an oval shape is opened as a single hole similarly to the first embodiment; however, the plurality of auxiliary holes 22 are not formed, which is different from the first embodiment.

The duct 16 is a cylindrical member. The main flow passage 18 is formed inside the duct 16 so that the working air flow to be blown from the main hole 14 passes through the main air passage 18. Specifically, the duct 16 is made of a flat tubular member in which the cross-sectional area of the main flow passage 18 is substantially constant. In the duct 16 of this embodiment, the cross-sectional area of the main flow passage 18 and the open area of the main hole 14 are approximately equal to each other.

The present inventors studied that it is effective to increase the reaching distance of the working air flow if the central portion of the working air flow and the velocity boundary layer BL are separated from each other. In accordance with this, a separation structure 50 configured to separate the boundary layer BL from the central portion of the working air flow is provided.

A contraction structure 51 configured to contract the airstream flowing through the main flow passage 18 is provided in the air discharge unit 10 as the separation structure 50. Although not shown, the contraction structure 51 extends along the long side of the inner wall surface 141 of the main hole 14 at a substantially central portion of the short side of the inner wall surface 141 of the main hole 14 so that the main flow passage 18 is divided into upper and lower parts. The contraction structure 51 has two ends in a longitudinal direction connected to the inside of the duct 16.

The contraction structure 51 has a streamlined cross section along the flow direction of the air flowing through the main flow passage 18. Specifically, the contraction structure 51 has a teardrop shape with excellent aerodynamic characteristics. That is, the contraction structure 51 is configured by an upstream end 511 having a rounded curved surface and located on the upstream side of the air flow, and a downstream end 512 having a sharper curved surface than the upstream end 511 and located on the downstream side of the air flow. In the contraction structure 51, the upstream end 511 constitutes a front edge and the downstream end 512 constitutes a rear edge.

Further, the contraction structure 51 has a maximum cross-sectional thickness at a position closer to the front edge than to the rear edge. The thickness of the cross section of the contraction structure 51 is set so that the thickness $\delta$ of the velocity boundary layer BL formed along the inner wall surface 141 of the main hole 14 becomes small. The contraction structure 51 of the present embodiment has an optimum shape so that the working air flow blown out of the main hole 14 has a top-hat type wind velocity distribution. For example, the contraction structure 51 is configured such that the passage cross-sectional area on the downstream side of the main flow passage 18 is about 1/10 of that on the upstream side. Preferably, the contraction structure 51 is configured such that the shortest distance Lf2 from the inner wall surface of the main hole 14 to the contraction structure 51 and the distance Lf1 from the inner wall surface 141 of the main hole 14 to the center line of the main hole 14 is 1/3.3 or larger. In the present embodiment, the contraction structure 51 constitutes a layer reduction structure configured to reduce the thickness $\delta$ of the velocity boundary layer BL formed along the inner wall surface 141 of the main hole 14.

The contraction structure 51 is positioned in a portion forming the main flow passage 18 inside the duct 16 so as not to protrude outside from the main hole 14. Specifically, the downstream end 512 of the contraction structure 51, located on the downstream side in the air flow direction, is positioned inside the main hole 14.

Figure 20:
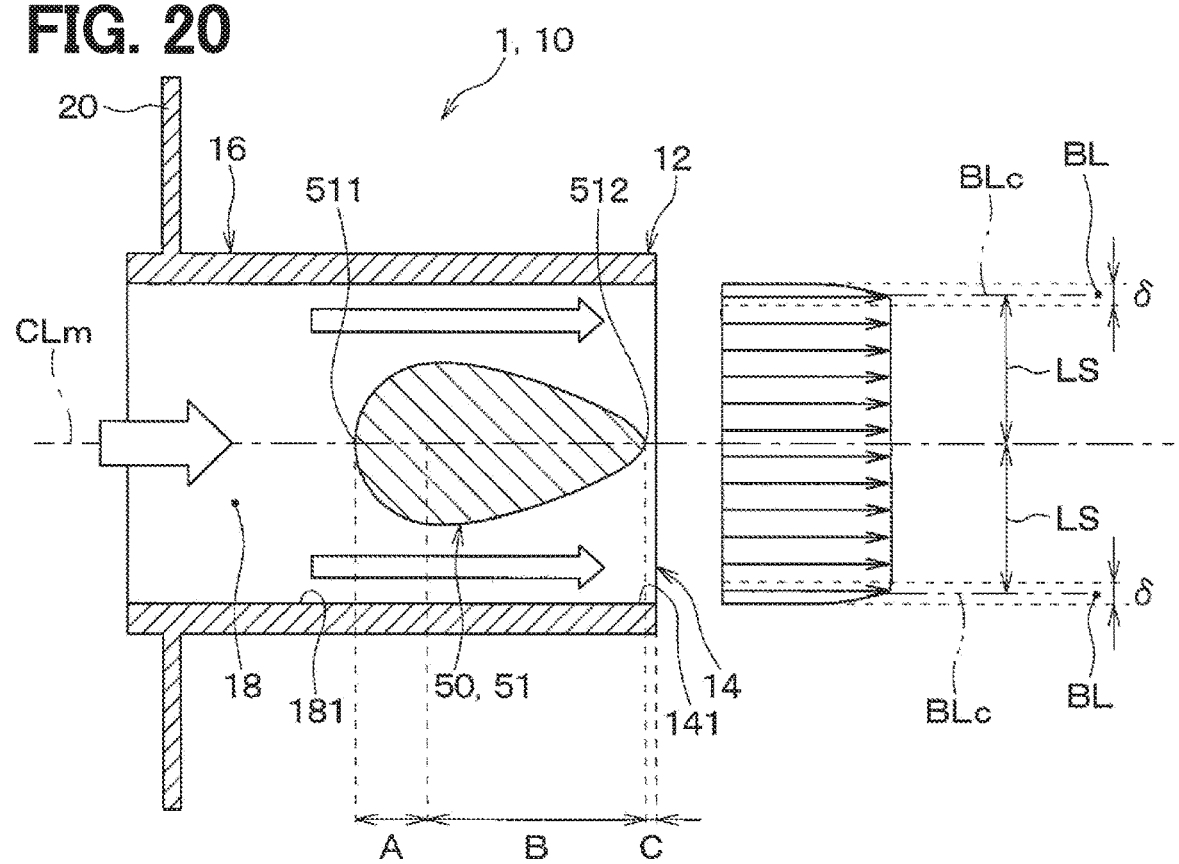
FIG. 20 is a diagram for explaining a velocity gradient of a working air flow at a downstream area of a main hole of the air discharge device, according to the fifth embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 20.

The main flow passage 18 is branched into two streams by the contraction structure 51, so that a contraction flow is generated before reaching the main hole 14. As a result, in the main flow passage 18, a flow velocity difference between the vicinity of the center line CLm of the main hole 14 and the vicinity of the inner wall surface 181 defining the main flow passage 18 becomes sufficiently small.

As described above, the contraction structure 51 is positioned inside the duct 16 so as not to project from the main hole 14. Therefore, the duct 16 is provided therein with an upstream section A in which the flow passage cross-sectional area is reduced by the contraction structure 51, an intermediate section B in which the flow passage cross-sectional area is enlarged by the contraction structure 51 compared to the upstream section A, and a downstream section C in which the flow passage cross-sectional area is almost not changed.

In the upstream section A, the flow passage cross-sectional area is reduced by the contraction structure 51, and the air flow is compressed, so that the flow velocity between the vicinity of the center line CLm of the main hole 14 and the vicinity of the inner wall surface 181 forming the main flow passage 18 is made sufficiently small. Thus, in the upstream section A, the thickness $\delta$ of the velocity boundary layer BL near the inner wall surface 181 defining the main flow passage 18 decreases as toward the downstream side due to the contraction flow effect of the contraction structure 51.

On the other hand, in the intermediate section B and the downstream section C, which are on the downstream side of the upstream section A, because the flow passage cross-sectional area is not small as toward downstream, the thickness $\delta$ of the velocity boundary layer BL near the inner wall surface 181 defining the main flow passage 18 becomes larger as toward downstream.

Specifically, in the intermediate section B, because the flow passage cross-sectional area is enlarged, the thickness $\delta$ of the velocity boundary layer BL near the inner wall surface 181 defining the main flow passage 18 gradually increases as toward the downstream side. However, in the contraction structure 51, the amount of change in the thickness of the cross section on the rear edge side positioned at the downstream side of the air flow is smaller than that on the front edge side. Therefore, the change in the flow passage cross-sectional area in the intermediate section B becomes slower than the change in the upstream section A, and the increase amount of the thickness $\delta$ of the velocity boundary layer BL in the intermediate section B is sufficiently smaller than the amount of decrease in the thickness $\delta$ in the upstream section A.

Further, in the downstream section C which is the downstream side of the intermediate section B, because the flow passage cross-sectional area is constant, the thickness δ of the velocity boundary layer BL near the inner wall surface 181 defining the main flow passage 18 slightly increases as toward the downstream side. However, the increase amount of the thickness δ of the velocity boundary layer BL in the downstream section C is extremely smaller than the decrease amount of the thickness δ of the velocity boundary layer BL in the upstream section A.

As described above, the reduction amount of the thickness δ of the velocity boundary layer BL in the upstream section A by the contraction structure 51 is sufficiently larger than the total increase amount of the thickness δ of the velocity boundary layer BL in the intermediate section B and the downstream section C.

When the working air flow is blown from the main hole 14, a velocity boundary layer BL of the working air flow is formed along the inner wall surface 141 of the main hole 14 at a downstream side of the outlet of the main hole 14. The thickness δ of the velocity boundary layer BL becomes smaller due to the contraction flow in the main flow path 18.

If the thickness δ of the velocity boundary layer BL of the working air flow formed downstream of the outlet of the main hole 14 is small, the central portion BLc of the thickness δ of the velocity boundary layer BL is separated from the center line CLm of the main hole 14 at the downstream side of the outlet of the main hole 14. Specifically, the distance LS between the central portion BLc of the thickness δ of the velocity boundary layer BL of the working air flow and the center line CLm of the main hole 14 becomes large. In this case, because the mainstream of the working air flow is separated from the vortex center of the lateral vortex Vt generated in the velocity boundary layer BL, the attenuation of the flow velocity in the central portion of the working air flow is reduced, and the reaching distance of the working air flow discharged from the main hole 14 can be made longer.

The air discharge device 1 described above is provided with the separation structure 50 so as to separate the central portion BLc of the thickness δ of the velocity boundary layer BL of the working air flow from the center line CLm of the main hole 14 at the downstream side of the outlet of the main hole 14. According to this, the attenuation of the flow velocity in the central portion of the working air flow is reduced, and the reaching distance of the working air flow blown out from the main hole 14 can be lengthened.

In particular, in the air discharge device 1 of the present embodiment, the contraction structure 51 is provided as the separation structure 50 with respect to the main flow passage 18. In this way, if the contraction structure 51 is provided in the main flow passage 18, a flow velocity difference between the vicinity of the center line CLm of the main hole 14 and the vicinity of the inner wall surface is reduced due to the contraction flow in the main flow passage 18, and the thickness δ of the velocity boundary layer BL can be reduced.

As described above, when the thickness δ of the velocity boundary layer BL is reduced, the working air flow formed at the downstream side of the outlet of the main hole 14 tends to have a top-hat type wind velocity distribution. In the top-hat type wind velocity distribution, the central portion of the thickness δ of the velocity boundary layer BL of the working air flow formed downstream of the outlet of the main hole 14 is largely separated from the center line CLm of the main hole 14. For this reason, it is possible to sufficiently suppress the attenuation of the flow velocity in the central portion of the working air flow and to extend the reaching distance of the working air flow.

The contraction structure 51 has a streamlined cross-section shape along the flow direction of the air flowing through the main flow passage 18. As described above, when the contraction structure 51 has a streamlined shape, separation of the airstream on the surface of the contraction structure 51 can be reduced, and turbulence of the airstream due to the contraction structure 51 can be sufficiently suppressed. It is effective for increasing the reaching distance of the working air flow.

Further, the contraction structure 51 is arranged at the inner wall surface 181 forming the main flow passage 18 such that the downstream end 512 of the contraction structure 51 located on the downstream side in the air flow direction of the air flowing through the main flow passage 18 does not protrude from the main hole 14 to the outside. According to this, the air flow blown out from the main hole 14 is not disturbed by the contraction structure 51, and thereby the attenuation of the flow velocity in the central portion of the working air flow can be sufficiently suppressed.

Modification of the Fifth Embodiment

In the above-described second embodiment, the contraction structure 51 has a streamline shape in cross section, but the present disclosure is not limited to this. The contraction structure 51 may have, for example, an oval shape whose cross-sectional shape extends along the air flow of the main flow passage 18. Moreover, as the contraction structure 51, for example, a member having a lattice shape may be adopted.

In the above-described fifth embodiment, an example in which the contraction structure 51 is arranged at the inner wall surface 181 forming the main flow passage 18 so as not to protrude from the main hole 14 to the outside has been described, but the present disclosure is not limited to this. The contraction structure 51 may be arranged in the main flow passage 18 so that the downstream end 512 protrudes from the main hole 14 to the outside, for example.

Sixth Embodiment

Next, a sixth embodiment will be described with reference to FIGS. 21 and 22. The present embodiment is different from the fifth embodiment in that an uneven portion 52 is provided on the inner wall surface 181 defining the main flow passage 18. In the present embodiment, a difference part different from the fifth embodiment will be mainly described, and description for a part similar to the fifth embodiment will be omitted.

Figure 21:
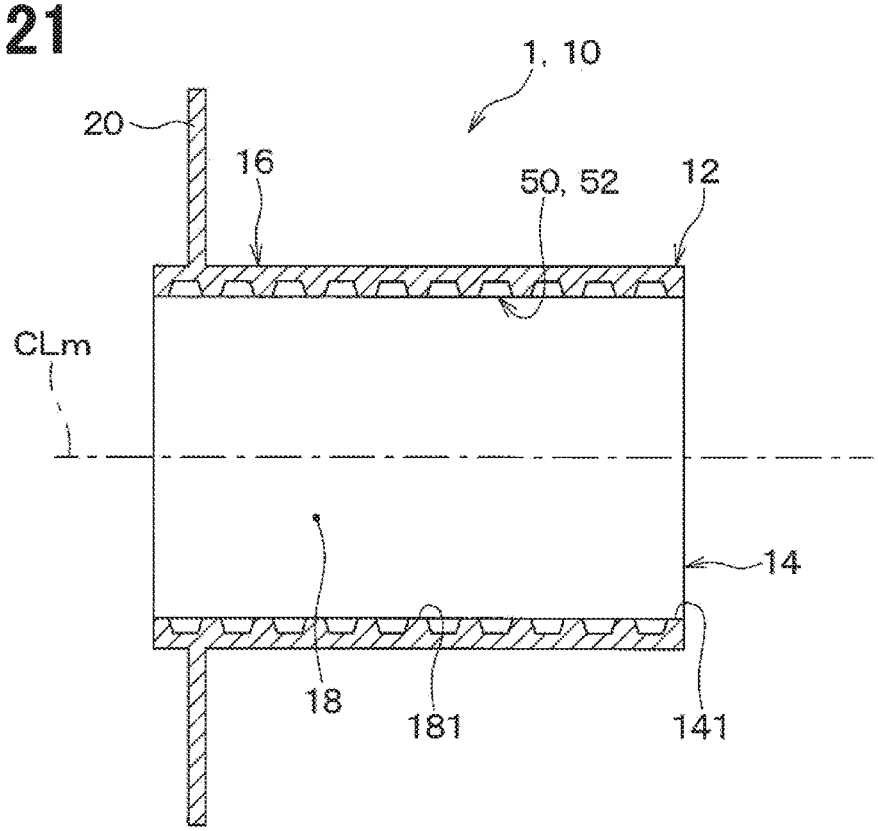
FIG. 21 is a schematic sectional view of an air discharge device according to a sixth embodiment.

As shown in FIG. 21, in the air discharge unit 10 of the present embodiment, the uneven portion 52, in which concave portions and convex portions are alternately arranged on the inner wall surface 181 defining the main flow passage 18, is provided along the flow direction of the air in the main flow passage 18. Specifically, the uneven portion 52 is formed inside the duct 16 over substantially the entire area of the inner wall surface 181 forming the main flow passage 18. The uneven portion 52 of the present embodiment is formed in the same manner as the uneven portion 30 described in the third embodiment.

Figure 22:
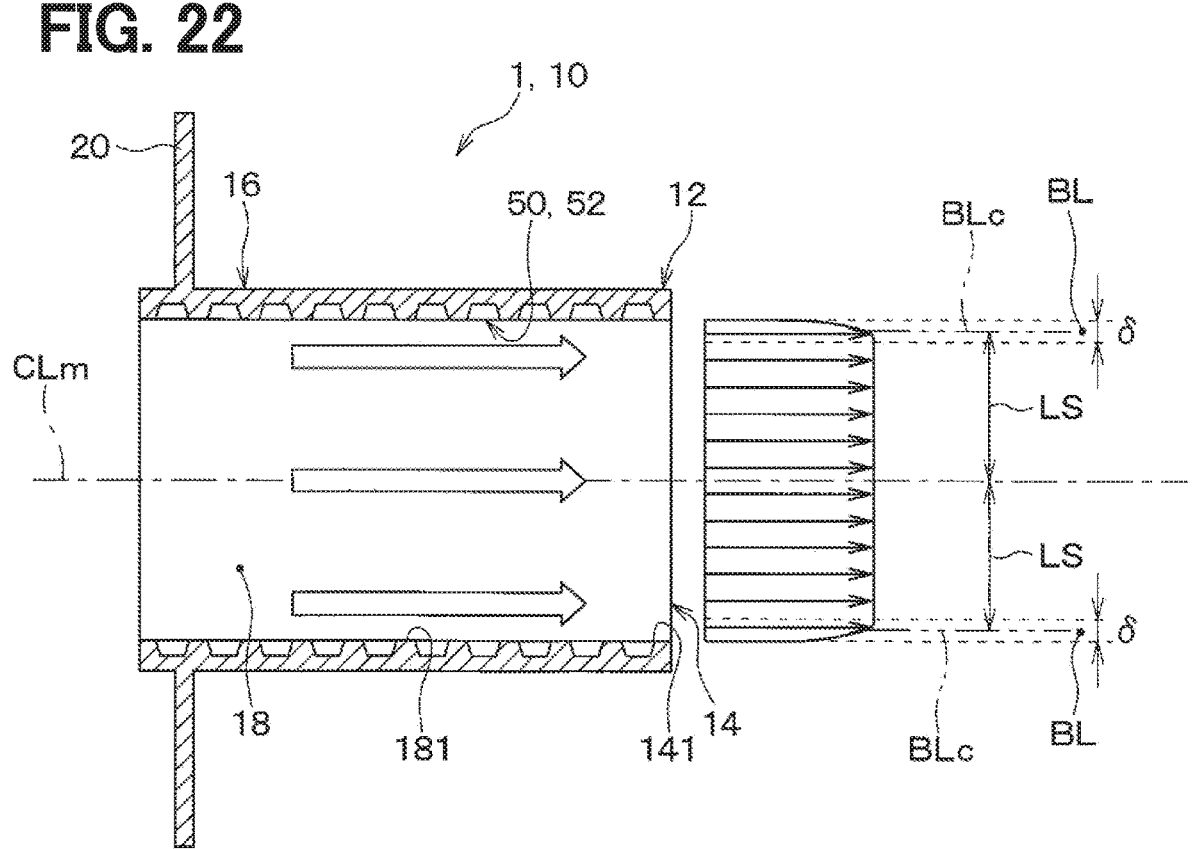
FIG. 22 is a diagram for explaining a velocity gradient of a working air flow at a downstream area of a main hole of the air discharge device, according to the sixth embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 22.

The inner wall surface 181 of the duct 16 defining the main flow passage 18 is provided with the uneven portion 52 in which the concave portions and the convex portions are alternately arranged in the main flow direction of the main flow passage 18. The uneven portion 52 is configured to generate vortices within the plurality of grooves when the airflow passes near the inner wall surface 181 forming the main flow passage 18. Because the vortex generated inside the uneven portion 52 plays a role of a ball bearing, the coefficient of friction of the inner wall surface 181 defining the main flow passage 18 becomes small. As a result, in the main flow passage 18, a flow velocity difference between the vicinity of the center line CLm of the main hole 14 and the vicinity of the inner wall surface 181 defining the main flow passage 18 becomes small.

When the air flow is blown from the main hole 14 and the auxiliary hole 22, a velocity boundary layer BL of the working air flow is formed along the inner wall surface 141 of the main hole 14 at a downstream side of the outlet of the main hole 14. The thickness δ of the velocity boundary layer BL becomes smaller due to the reduction in the friction coefficient by the uneven portion 52. That is, the central portion BLc of the thickness δ of the velocity boundary layer BL of the working air flow is separated from the center line CLm of the main hole 14 at a downstream side of the outlet of the main hole 14. Specifically, the distance LS between the central portion BLc of the thickness δ of the velocity boundary layer BL of the working air flow and the center line CLm of the main hole 14 becomes large. In the present embodiment, the uneven portion 52 provided in the main flow passage 18 functions as the separation structure 50 and the layer reduction structure.

In the air discharge device 1 described above, since the uneven portion 52 is provided at the inner wall surface 181 forming the main flow path 18, the thickness δ of the velocity boundary layer BL can be made sufficiently small by the reduction effect of the friction coefficient of the inner wall surface 181 forming the main flow passage 18. Thus, the attenuation of the flow velocity in the central portion of the working air flow is reduced, and the reaching distance of the working air flow blown out from the main hole 14 can be lengthened.

Modification of Sixth Embodiment

In the above-described sixth embodiment, the uneven portion 52 is configured by the plurality of grooves, but the present disclosure is not limited to this. The uneven portion 52 may be formed by a plurality of protrusions, for example.

In the above-described sixth embodiment, the uneven portion 52 is formed inside of the duct 16 substantially in the entire area of the inner surface 181 of the main flow passage 18, but the present disclosure is not limited to this. The uneven portion 52 may be formed on a part of the inner wall surface 181 forming the main flow passage 18.

Further, in the above-described sixth embodiment, the structure including the uneven portion 52 is illustrated as the layer reduction structure, but the layer reduction structure is not limited to this. The layer reduction structure may have a structure including the contraction structure 51 and the uneven portion 52, for example.

Seventh Embodiment

Next, a seventh embodiment will be described with reference to FIGS. 23 and 24. The present embodiment is different from the first embodiment in that a main hole 14 is expanded in a gradually enlarged tube shape. In the present embodiment, a difference part different from the fifth embodiment will be mainly described, and description for a part similar to the fifth embodiment will be omitted.

Figure 23:
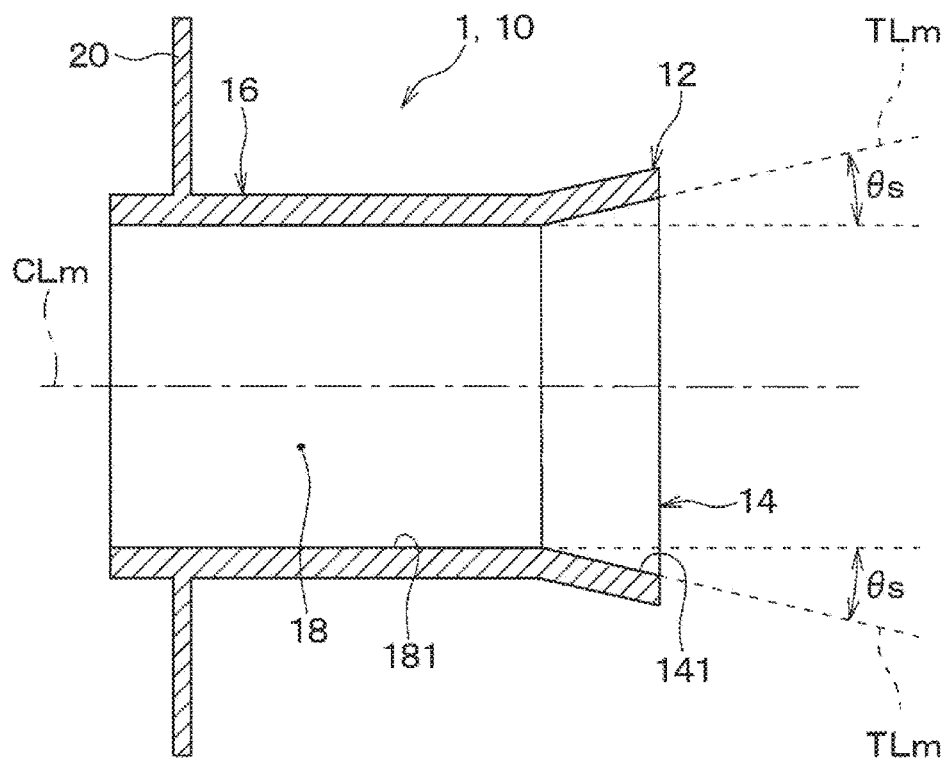
FIG. 23 is a schematic sectional view of an air discharge device according to a seventh embodiment.

As shown in FIG. 23, in an air discharge unit 10 of the present embodiment, a portion near the main hole 14 is expanded in a trumpet shape. Specifically, the main hole 14 is enlarged so that the inner wall surface 141 thereof is away from the center line CLm of the main hole 14 as toward the downstream side in the air flow direction.

If the vicinity of the main hole 14 is extremely widened, the airflow may be separated from the wall surface and the turbulence may increase. Therefore, in the main hole 14, it is desirable that an angle θs formed by the center line CLm and the tangent line TLm of the inner wall surface 141 is set to, for example, 7° or less.

Figure 24:
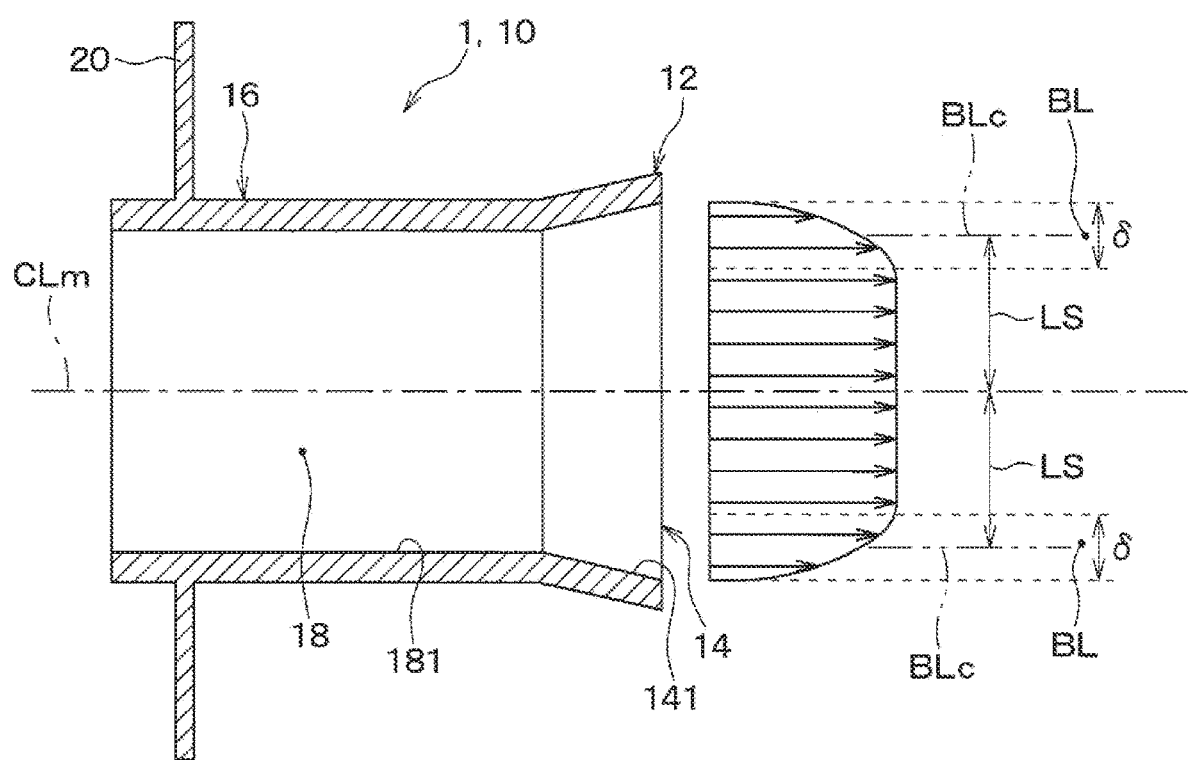
FIG. 24 is a diagram for explaining a velocity gradient of a working air flow at a downstream area of a main hole of the air discharge device, according to the seventh embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 24. Then, the airstream flowing into the main flow passage 18 is blown out of the main hole 14. At this time, since the main hole 14 is expanded in a trumpet shape, a velocity boundary layer BL of the working air flow is separated from the center line CLm of the main hole 14 at a downstream side of the outlet of the main hole 14. Specifically, the distance LS between the central portion BLc of the thickness δ of the velocity boundary layer BL of the working air flow and the center line CLm of the main hole 14 becomes large. In this embodiment, the expanded shape of the inner wall surface 141 of the main hole 14 functions as the separation structure 50.

In the air discharge device 1 described above, since the main hole 14 is expanded in a trumpet shape, the velocity boundary layer BL of the working air flow formed downstream of the outlet of the main hole 14 is easily separated from the center line CLm of the main hole 14. According to this, the attenuation of the flow velocity in the central portion of the working air flow is reduced, and the reaching distance of the working air flow blown out from the main hole 14 can be lengthened.

Modification of the Seventh Embodiment

In the above-described seventh embodiment, the structure in which the inner wall surface 141 of the main hole 14 is expanded is illustrated as the separation structure 50, but the present disclosure is not limited to this. The separation structure 50 may be, for example, a structure in which at least one of the contraction structure 51 or the uneven portion 52 is added to the case in which the inner wall surface 141 of the main hole 14 is expanded.

Eighth Embodiment

Next, an eighth embodiment will be described with reference to FIGS. 25 and 26. The present embodiment differs from the fifth embodiment in that an enlarged portion 180 is provided in the main flow passage 18. In the present embodiment, a difference part different from the fifth embodiment will be mainly described, and description for a part similar to the fifth embodiment will be omitted.

Figure 25:
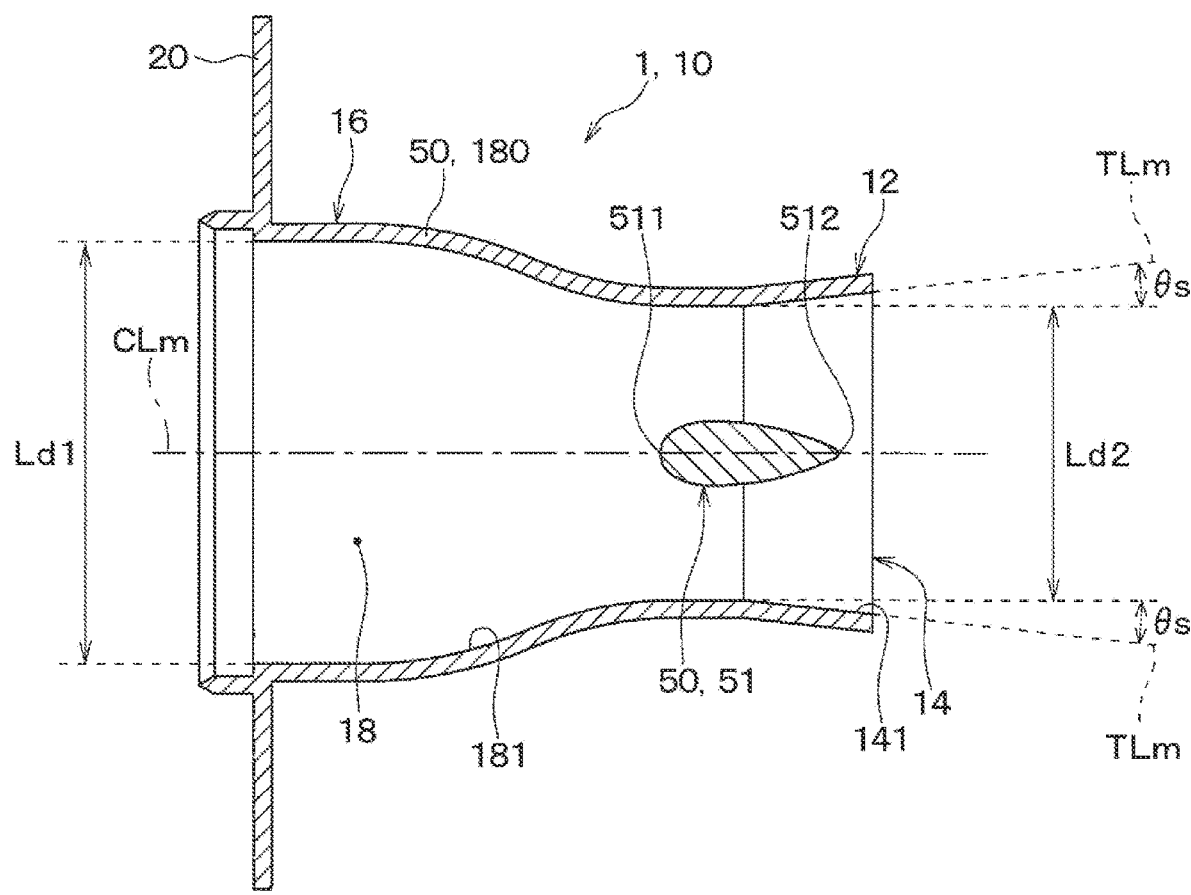
FIG. 25 is a schematic sectional view of an air discharge device according to an eighth embodiment.

As shown in FIG. 25, in an air discharge unit 10, not only a contraction structure 51 but also an enlarged portion 180 having a cross-sectional area Sc larger than the open area Sm of the main hole 14 is provided with respect to the main flow passage 18 of the duct 16, as a separation structure 50. Specifically, the main flow passage 18 has the largest cross-sectional area on the upstream side of the contraction structure 51 in the air flow direction, and has the smallest cross-sectional area at a location where the contraction structure 51 is arranged. The air discharge unit 10 is configured such that the cross-sectional area at the location where the contraction structure 51 is arranged is, for example, about one-tenth of the largest cross-sectional area of the main flow passage 18 on the upstream side from the contraction structure 51. Specifically, the duct 16 of the air discharge unit 10 has a cross-sectional dimension that is set such that a ratio of an inner diameter Ld2 at the position where the contraction structure 51 is arranged to the inner diameter Ld1 on the most upstream side is 1/3.3 or more.

In addition, in an air discharge unit 10 of the present embodiment, a portion near the main hole 14 is expanded in a trumpet shape. Specifically, the main hole 14 is enlarged so that the inner wall surface 141 thereof is away from the center line CLm of the main hole 14 as toward the downstream side in the air flow direction. In this embodiment, the contraction structure 51, the enlarged portion 180 and the expanded shape of the inner wall surface 141 of the main hole 14 function as a separation structure 50. In addition, in the present embodiment, the contraction structure 51 and the enlarged portion 180 function as a layer reduction structure.

Figure 26:
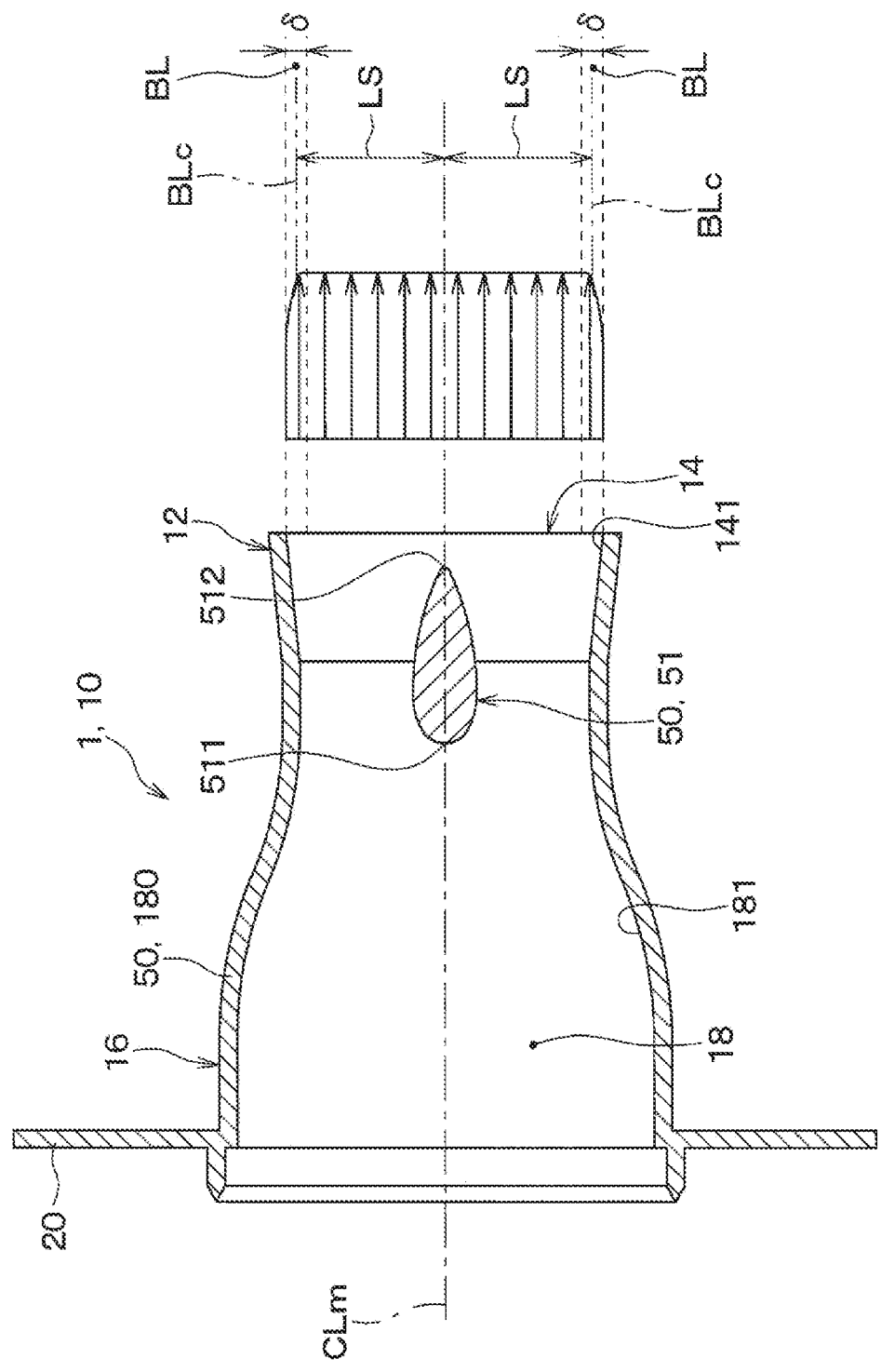
FIG. 26 is a diagram for explaining a velocity gradient of a working air flow at a downstream area of a main hole of the air discharge device, according to the eighth embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 26.

Since the main flow passage 18 is provided with the enlarged portion 180 having a cross-sectional area larger than the open area of the main hole 14, a contraction flow is generated from the enlarged portion 180 to the main hole 14. As a result, in the main flow passage 18, a flow velocity difference between the vicinity of the center line CLm of the main hole 14 and the vicinity of the inner wall surface 181 defining the main flow passage 18 becomes small. In addition, since the contraction structure 51 is arranged in the main flow passage 18, a contraction flow also occurs due to the contraction structure 51. As a result, in the main flow passage 18, a flow velocity difference between the vicinity of the center line CLm of the main hole 14 and the vicinity of the inner wall surface 181 defining the main flow passage 18 becomes sufficiently small.

Then, the airstream flowing into the main flow passage 18 is blown out of the main hole 14. At this time, since the main hole 14 is expanded in a trumpet shape, a velocity boundary layer BL of the working air flow is formed downstream of the outlet of the main hole 14 to be separated from the center line CLm of the main hole 14. Specifically, the distance LS between the central portion BLc of the thickness δ of the velocity boundary layer BL of the working air flow and the center line CLm of the main hole 14 becomes large.

In the air discharge device 1 described above, because the layer reduction structure includes not only the contraction structure 51 but also the enlarged portion 180, the thickness δ of the velocity boundary layer BL due to contraction can be reduced. Further, since the main hole 14 is expanded in a trumpet shape, the velocity boundary layer BL of the working air flow formed downstream of the outlet of the main hole 14 is easily separated from the center line CLm of the main hole 14. As a result, it is possible to increase the reaching distance of the working air flow blown out from the main hole 14.

Ninth Embodiment

Next, a ninth embodiment will be described with reference to FIGS. 27 to 29. The present embodiment is different from the eighth embodiment in that a vertical vortex generation mechanism 53 is provided at an upstream end 511 of a contraction structure 51. In the present embodiment, a difference part different from the eighth embodiment will be mainly described, and description for a part similar to the eighth embodiment will be omitted.

Figure 27:
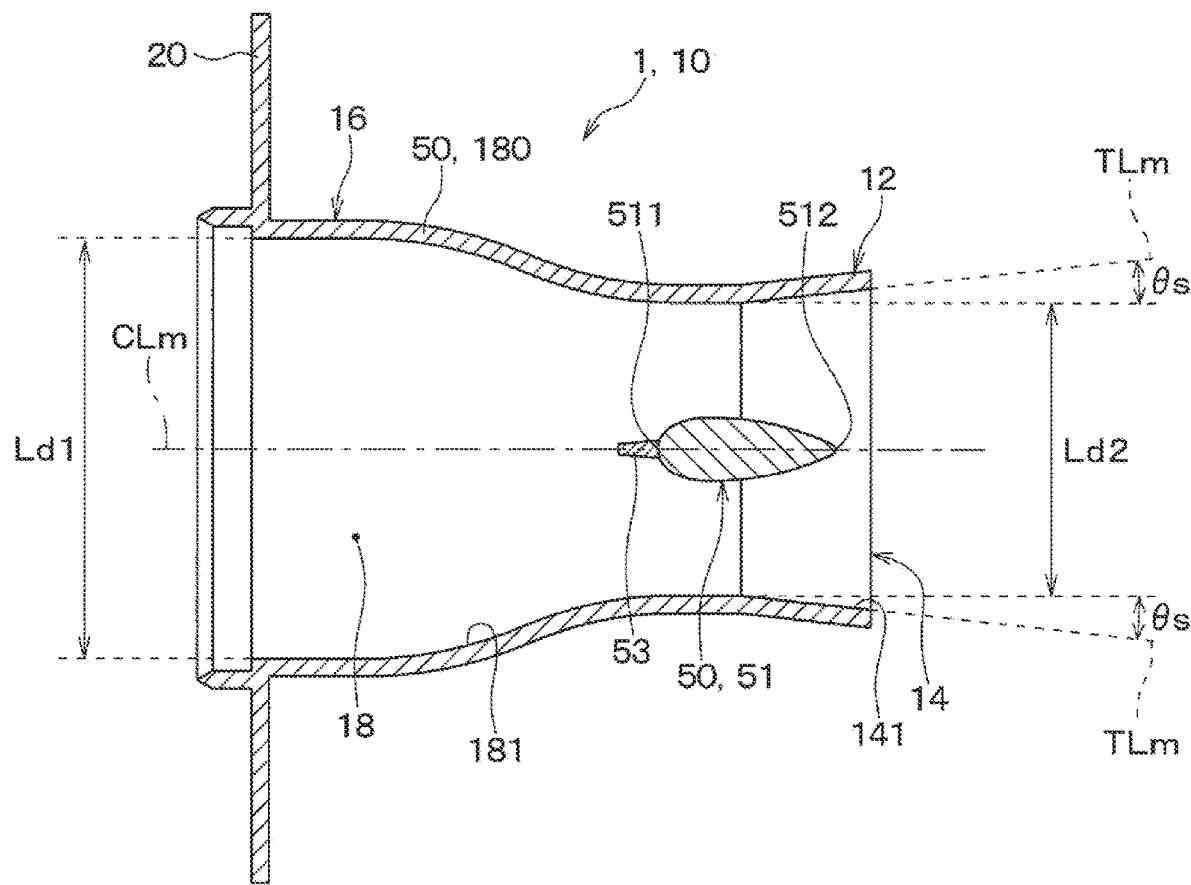
FIG. 27 is a schematic sectional view of an air discharge device according to a ninth embodiment.
Figure 28:
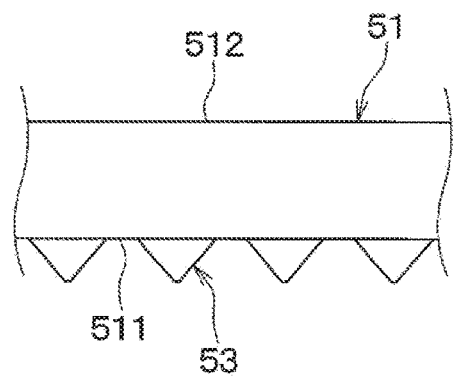
FIG. 28 is a schematic top view showing a structure provided in the air discharge device according to the ninth embodiment.

As shown in FIGS. 27 and 28, the contraction structure 51 is provided with the vertical vortex generation mechanism 53 having an uneven shape at the upstream end 511. The vertical vortex generation mechanism 53 is configured to generate a vertical vortex near the upstream end 511 of the contraction structure 51. The vertical vortex is a spiral vortex having a vortex center oriented in the same direction as the mainstream air flow direction.

The vertical vortex generation mechanism 53 is configured by a plurality of uneven-shaped protrusion pieces protruding from the upstream end 511 of the contraction structure 51. Specifically, the vertical vortex generation mechanism 53 is made of a plurality of triangular protrusion pieces formed at the upstream end 511. The protrusion piece has a sharpened shape by linearly intersecting two sides extending toward the tip.

Figure 29:
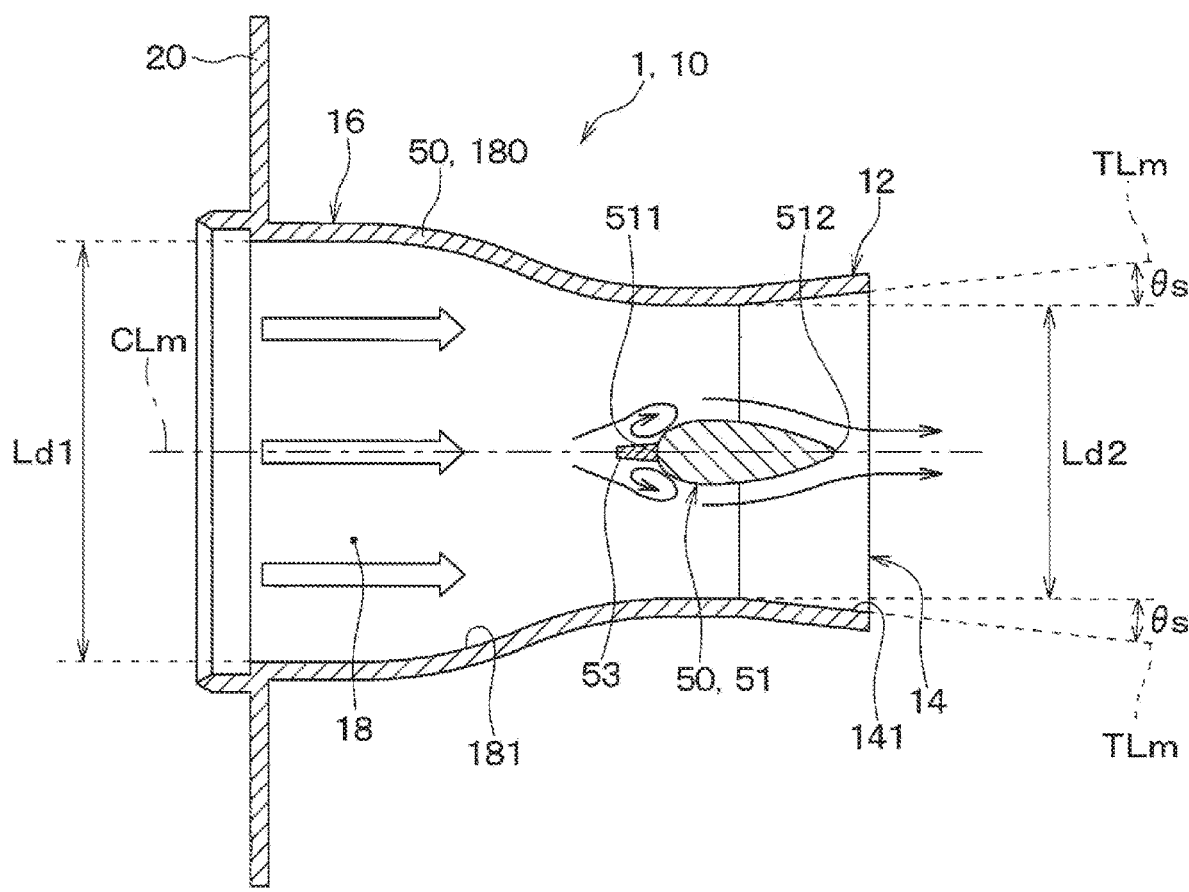
FIG. 29 is a schematic cross-sectional view showing a downstream area of a main hole in a main flow passage of the air discharge device according to the ninth embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 29. Since the contraction structure 51 is disposed in the main flow passage 18, a contraction flow is generated by the contraction structure 51, and thereby the airstream flowing around the contraction structure 51 may be separated from the contraction structure 51 to be disturbed.

However, in the present embodiment, since the vertical vortex generation mechanism 53 is provided at the upstream end 511 of the contraction structure 51, vertical vortex is generated when the air flow passes through near the upstream end 511 of the contraction structure 51. The vertical vortex generated by the vertical vortex generation mechanism 53 is a spiral vortex having a vortex center oriented in the same direction as the airstream flowing around the contraction structure 51, and includes a velocity component toward the surface of the contraction structure 51. Therefore, the airstream flowing around the contraction structure 51 is pressed toward the surface of the contraction structure 51 by the vertical vortex generated by the vertical vortex generation mechanism 53, so as to easily flow along the surface of the contraction structure 51.

The other configurations are similar to those of the eighth embodiment. Since the air discharge device 1 of the present embodiment has the same configuration as that of the eighth embodiment, it is possible to obtain the same operational effect as that of the eighth embodiment by the common configuration.

In particular, in the air discharge device 1 of the present embodiment, since the vertical vortex generation mechanism 53 is provided at the upstream end 511 of the contraction structure 51, the airstream flowing around the contraction structure 51 easily flows along the surface of the contraction structure 51 by the vertical vortices generated by the vertical vortex generation mechanism 53. As a result, it is possible to sufficiently suppress a turbulence of the working air flow by the addition of the contraction structure 51.

Modification of the Ninth Embodiment

In the above-described ninth embodiment, the vertical vortex generation mechanism 53 is provided in the contraction structure 51 of the air discharge device 1 described in the eighth embodiment; however, the structure is not limited to this. The vertical vortex generation mechanism 53 may be added to the contraction structure 51 described in the seventh embodiment, for example. Alternatively, the vertical vortex generation mechanism 53 may be added to the contraction fin 28 described in the above second embodiment.

Tenth Embodiment

Next, a tenth embodiment will be described with reference to FIG. 30. The present embodiment differs from the sixth embodiment in that an enlarged portion 180 is provided in the main flow passage 18. In the present embodiment, a difference part different from the sixth embodiment will be mainly described, and description for a part similar to the sixth embodiment will be omitted.

Figure 30:
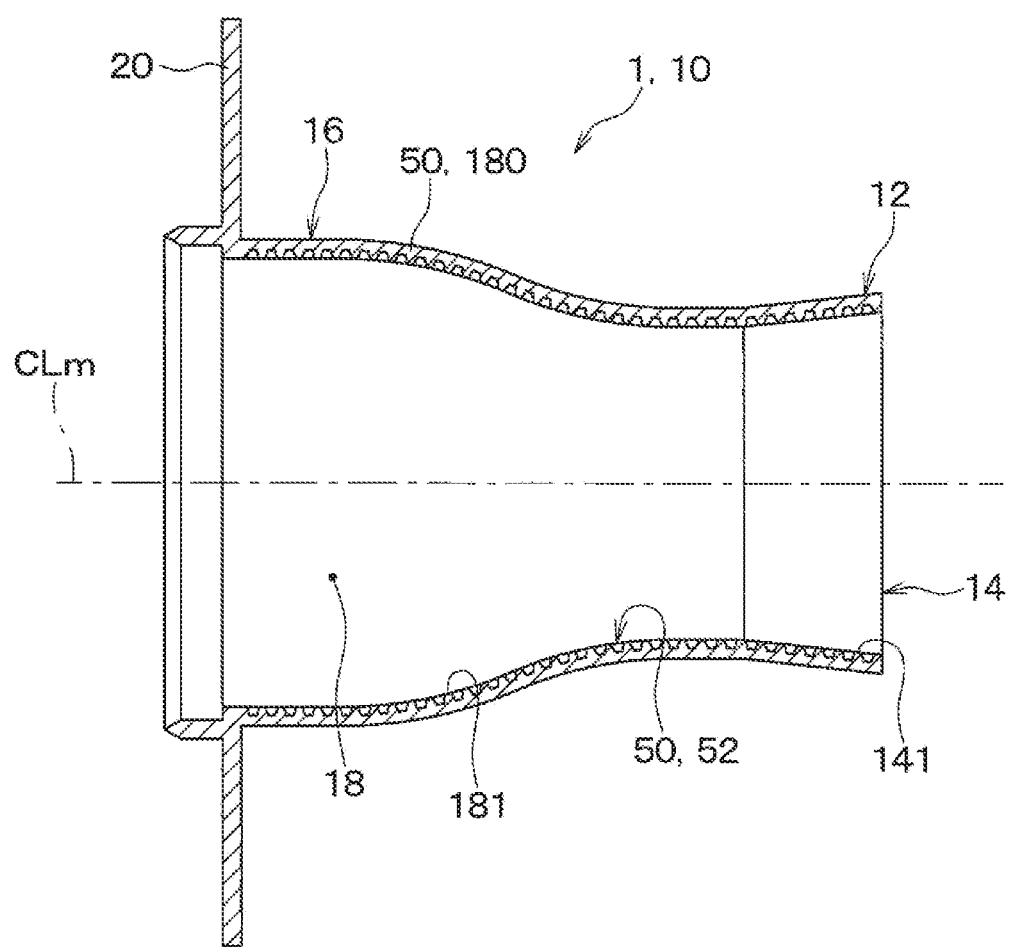
FIG. 30 is a schematic sectional view of an air discharge device according to a tenth embodiment.

As shown in FIG. 30, in an air discharge unit 10, not only an uneven portion 52 but also an enlarged portion 180 having a cross-sectional area Sc larger than the open area Sm of the main hole 14 is provided with respect to the main flow passage 18 of the duct 16, as a separation structure 50. Specifically, the main flow passage 18 has the largest cross-sectional area on the upstream side in the air flow direction, and has the smallest cross-sectional area at a location near the main hole 14. The air discharge unit 10 is configured such that the open area of the main hole 14 is, for example, about one-tenth of the largest cross sectional area of the duct 16 on the upstream side. Specifically, the duct 16 of the air discharge unit 10 has a cross-sectional dimension that is set such that a ratio of an inner diameter Ld2 of the main hole 14 to the inner diameter Ld1 on the upstream area of the duct 16 is 1/3.3 or more. In the present embodiment, the uneven portion 52 provided in the main flow passage 18 functions as the separation structure 50 and the layer reduction structure.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 30. At this time, the vortex generated inside the uneven portion 52 when the airflow passes near the inner wall surface 181 forming the main flow passage 18 plays a role of a ball bearing, and thereby the coefficient of friction on the inner wall surface 181 forming the main flow passage 18 can be reduced. As a result, in the main flow passage 18, a flow velocity difference between the vicinity of the center line CLm of the main hole 14 and the vicinity of the inner wall surface 181 defining the main flow passage 18 becomes small.

In addition, since the main flow passage 18 is provided with the enlarged portion 180 having a cross-sectional area larger than the open area of the main hole 14, a contraction flow is generated from the enlarged portion 180 to the main hole 14. As a result, in the main flow passage 18, a flow velocity difference between the vicinity of the center line CLm of the main hole 14 and the vicinity of the inner wall surface 181 defining the main flow passage 18 becomes sufficiently small. Then, the airstream flowing into the main flow passage 18 is blown out of the main hole 14. Thus, a velocity boundary layer BL of the working air flow is formed downstream of the outlet of the main hole 14 to be separated from the center line CLm of the main hole 14.

In the air discharge device 1 described above, because the layer reduction structure includes not only the uneven portion 52 but also the enlarged portion 180, the thickness δ of the velocity boundary layer BL due to contraction can be reduced. As a result, the velocity boundary layer BL of the working air flow formed downstream of the outlet of the main hole 14 can be easily separated from the center line CLm of the main hole 14, and the reaching distance of the working air flow blown out from the main hole 14 can be increased.

Eleventh Embodiment

Next, an eleventh embodiment will be described with reference to FIGS. 31 and 32. The present embodiment differs from the fifth embodiment in that a contracted shape section 183 is provided in a duct 6. In the present embodiment, a difference part different from the fifth embodiment will be mainly described, and description for a part similar to the fifth embodiment will be omitted.

Figure 31:
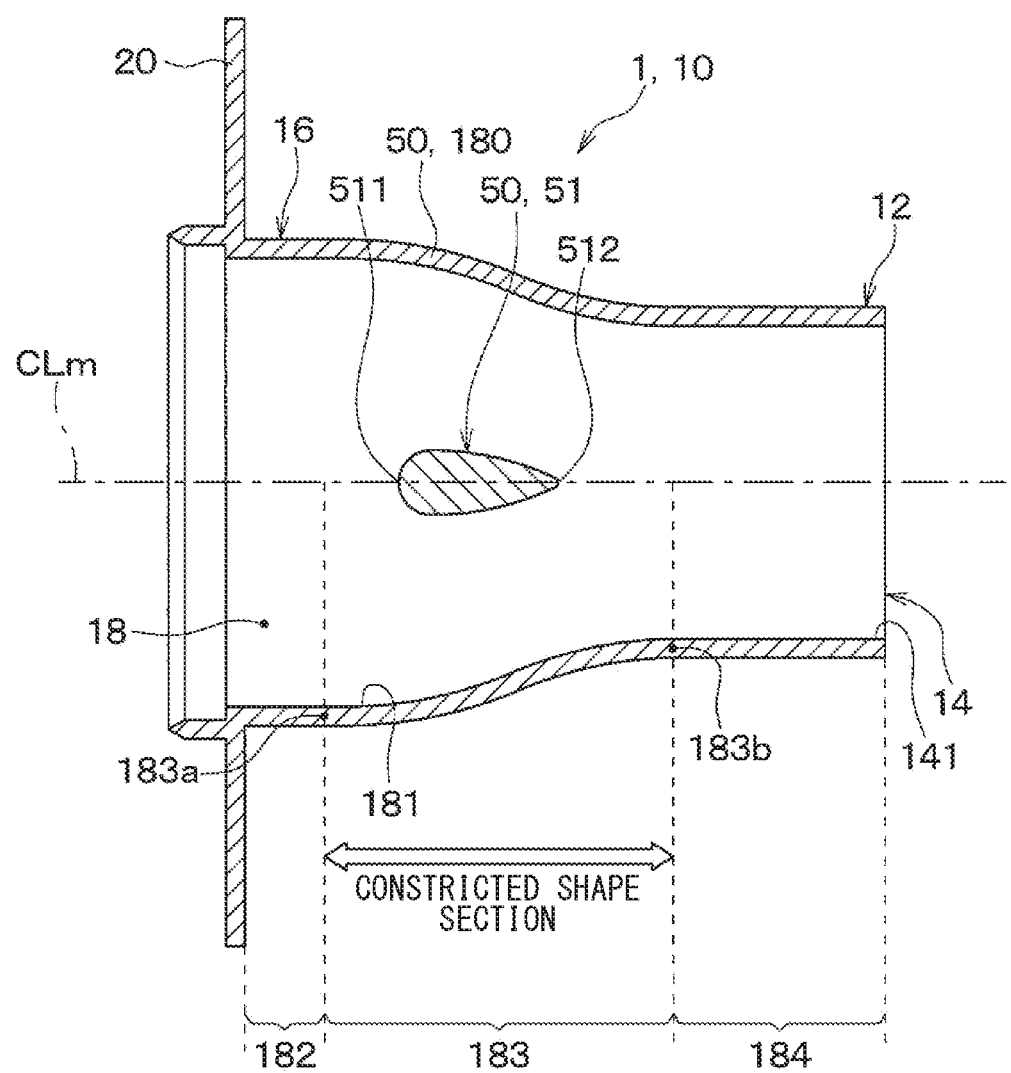
FIG. 31 is a schematic sectional view of an air discharge device according to an eleventh embodiment.

As shown in FIG. 31, in the air discharge unit 10, the flow passage cross-sectional area of the main flow passage 18 is reduced from the upstream side to the downstream side in the air flow direction. Specifically, an upstream flat section 182, the contracted shape section 183, and a downstream flat section 184 are provided on the inner wall surface 18 defining the main flow passage 18.

The upstream flat section 182 is made of a portion of the inner wall surface 181 forming the main flow path 18 at an upstream area of the air flow direction. The upstream flat section 182 has a flat shape along the air flow direction so that the cross-sectional area is substantially constant.

The downstream flat section 184 is made of a portion of the inner wall surface 181 forming the main flow path 18 at a downstream area of the air flow direction. The downstream flat section 184 has a flat shape along the air flow direction so that the cross-sectional area is substantially constant. A cross-sectional area of the downstream flat section 184 is about 1/10 of the cross-sectional area of the upstream flat section 182.

The contracted shape section 183 corresponds to the enlarged portion 180 described in the eighth embodiment. The contracted shape section 183 is a connection portion that connects the upstream flat section 182 and the downstream flat section 184. The contracted shape section 183 is a portion that reduces the flow passage cross-sectional area of the main flow passage 18 from the upstream side to the downstream side in the air flow direction.

An upstream end 183a of the contracted shape section 183, located upstream in the air flow direction, is connected to the upstream flat section 182, and a downstream end 183b of the contracted shape section 183, located downstream in the air flow direction, is connected to the downstream flat section 184. The upstream end 183a and the downstream end 183b of the contracted shape section 183 are provided in a shape along the air flow direction, so that the connection portions connected with the upstream flat section 182 and the downstream flat section 184 are a continuous curved surface without a step.

A dimension of a contraction structure 51 in the air flow direction is smaller than the length of the contracted shape section 183 in the inner wall surface 181 forming the main flow passage 18. The contraction structure 51 is arranged in the main flow passage 18 so as to be located within the contracted shape section 183 of the inner wall surface 181 forming the main flow passage 18. That is, the upstream end 511 located on the upstream side of the contraction structure 51 in the air flow direction is positioned downstream of the upstream end 183a of the contracted shape section 183. Furthermore, the downstream end 512 located on the downstream side of the contraction structure 51 in the air flow direction is positioned upstream of the downstream end 183b of the contracted shape section 183.

In the air discharge unit 10 of the present embodiment configured as described above, when the conditioned air temperature-adjusted by the air conditioning unit flows into the duct 16, the conditioned air passes through the main flow passage 18 and flows into the main hole 14. In the main flow passage 18, the contraction structure 51 is arranged, and the inner wall surface 181 forming the main flow passage 18 is provided with the contracted shape section 183. Thus, in the main flow passage 18, a flow velocity difference between the vicinity of the center line CLm of the main hole 14 and the vicinity of the inner wall surface 181 defining the main flow passage 18 becomes sufficiently small.

Figure 32:
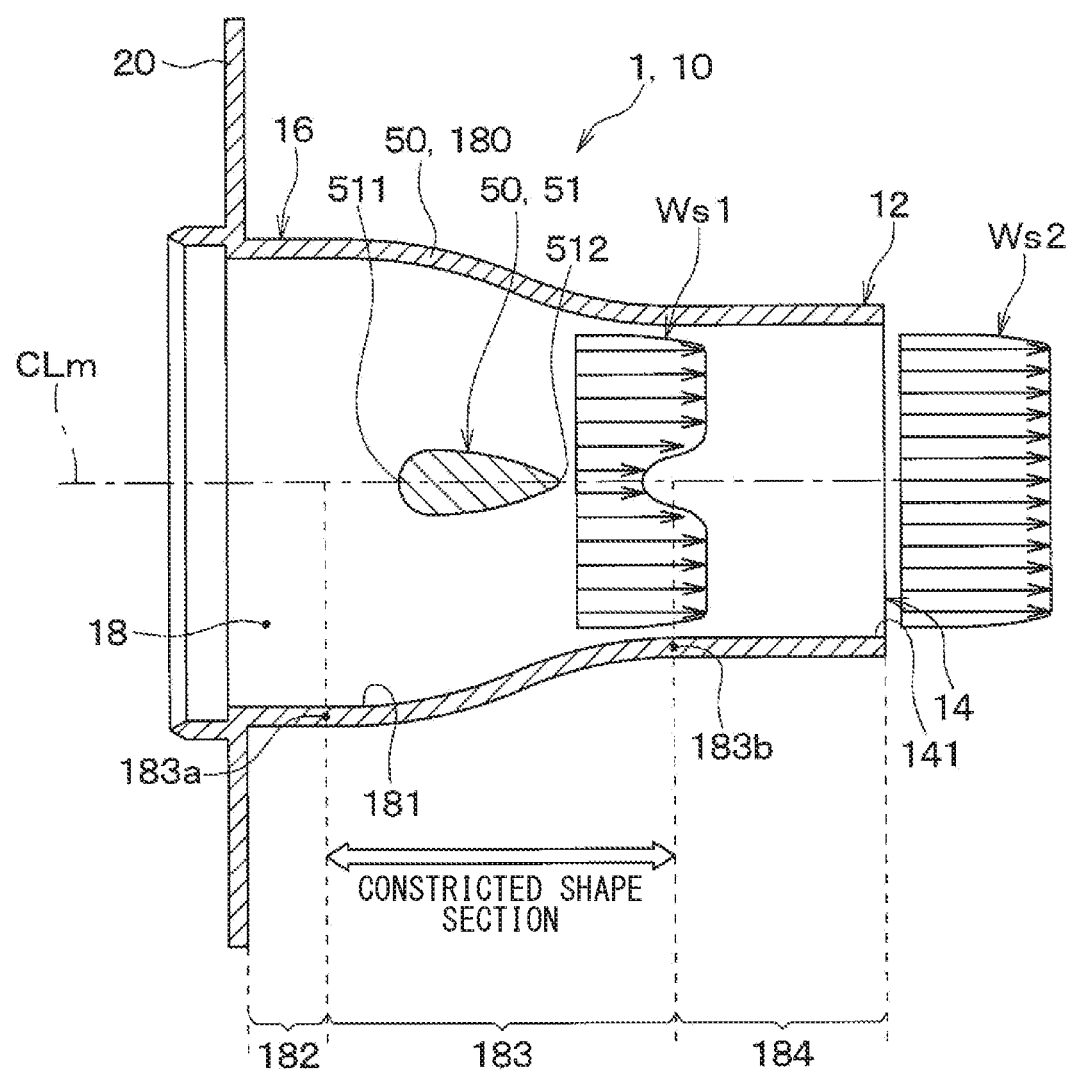
FIG. 32 is a diagram for explaining a velocity gradient of a working air flow at a downstream area of a main hole of the air discharge device, according to the eleventh embodiment.

Here, as shown in FIG. 32, in the vicinity of the downstream end 512 of the contraction structure 51 in the main flow passage 18, a concave wind velocity distribution Ws1 is caused by the contraction structure 51. That is, in the vicinity of the downstream end 512 of the contraction structure 51 in the main flow passage 18, the flow velocity of airstream in the vicinity of the inner wall surface 181 of the main flow passage 18 becomes greater than that of the central portion of the main flow passage 18 due to the contraction effect of the contraction structure 51 and the contraction shape section 183. If the airflow is blown out from the main hole 14 with the concave wind velocity distribution Ws1, the core portion of the airflow blown out from the main hole 14 may be easily disturbed.

In the present embodiment, the downstream end 512 of the contraction structure 51 is positioned upstream of the downstream end 183b of the contracted shape section 183. In this case, a contraction flow is generated by the contraction shape section 183 even on the downstream side of the contraction structure 51, and air easily flows to the downstream side of the location where the contraction structure 51 is arranged. As a result, the flow velocity once reduced at the location where the contraction structure 51 is arranged can be recovered downstream of the contraction structure 51. That is, the working air flow formed downstream of the outlet of the main hole 14 likely becomes in a top-hat type wind velocity distribution Ws2.

In the air discharge device 1 described above, because the layer reduction structure includes not only the contraction structure 51 but also the enlarged portion 180, the thickness δ of the velocity boundary layer BL due to contraction can be reduced. Since the downstream end 512 of the contraction structure 51 is positioned on the upstream side of the downstream end 183b of the contracted shape section 183, the working air flow at a downstream side of the outlet of the main hole 14 can easily become in a top-hat type wind velocity distribution. As a result, it is possible to increase the reaching distance of the working air flow blown out from the main hole 14.

Modification of the Eleventh Embodiment

The eleventh embodiment described above exemplifies a structure in which the contraction structure 51 is arranged within the contracted shape section of the inner wall surface 181 forming the main flow passage 18, but the present disclosure is not limited to this.

Figure 33:
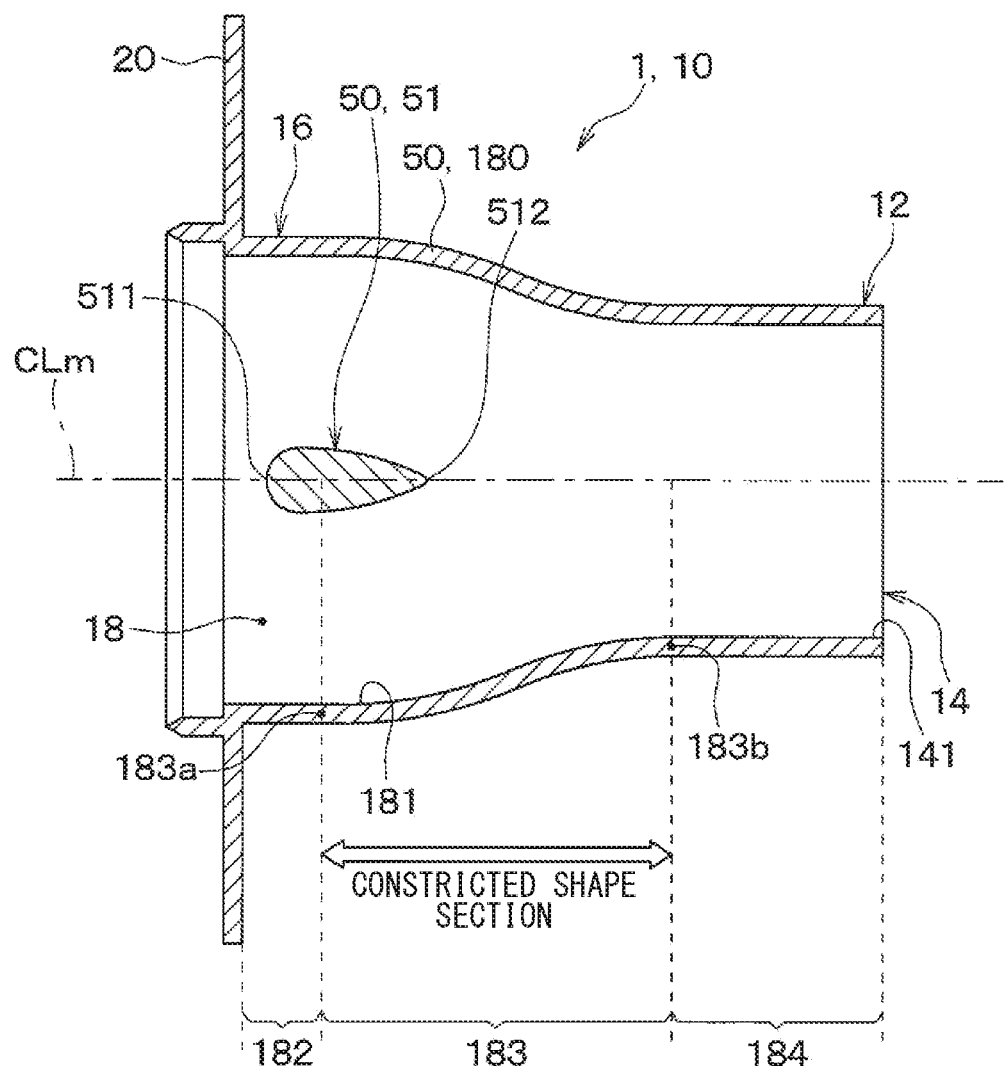
FIG. 33 is a schematic sectional view showing a first modification of the air discharge device according to the eleventh embodiment.

For example, as shown in a first modification of FIG. 33, the downstream end 512 of the contraction structure 51 may be positioned upstream of the downstream end 183b of the contracted shape section 183, while the upstream end 511 of the contraction structure 51 is positioned on the upstream side of the upstream end 183a of the contracted shape section 183. Even in this case, the similar effects with the eleventh embodiment can be obtained.

Figure 34:
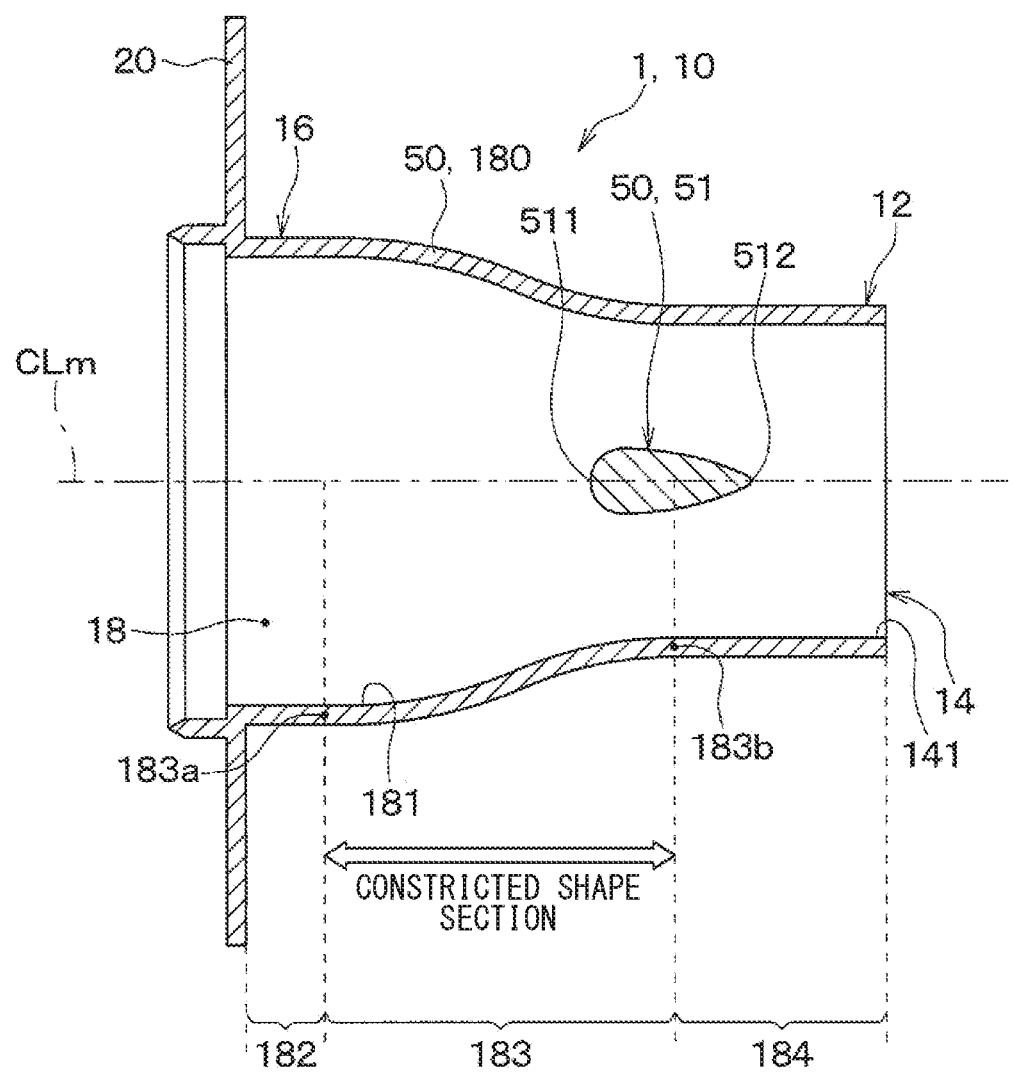
FIG. 34 is a schematic sectional view showing a second modification of the air discharge device according to the eleventh embodiment.

Alternatively, as shown in a second modification of FIG. 34, the upstream end 511 of the contraction structure 51 may be positioned downstream of the upstream end 183a of the contracted shape section 183, while the downstream end 512 of the contraction structure 51 is positioned on the downstream side of the downstream end 183b of the contracted shape section 183.

In the eleventh embodiment described above, the inner wall surface 181 forming the main flow passage 18 has the upstream flat section 182, the contracted shape section 183, and the downstream flat section 184; however, the present disclosure is not limited to this. In the air discharge unit 10, the upstream flat section 182 and the downstream flat section 184 may be not provided as long as the contracted shape section 183 is provided at the inner wall surface 181 forming the main flow passage 18. Further, in the air discharge unit 10, the downstream side of the contracted shape section 183 may be expanded in a trumpet shape.

Other Embodiments

The representative embodiments of the present disclosure have been described above. However, the present disclosure is not limited to the above-described embodiments, and may be variously modified as follows.

In the above embodiment, an example in which a single main hole 14 is formed in the hole forming member 12 has been described, but the present disclosure is not limited to this. The air discharge device 1 may have a structure in which a plurality of main holes 14 are formed in the hole forming member 12. In this case, for example, a plurality of auxiliary holes 22 may be arranged to surround the plurality of main holes 14 arranged as a single hole group, or may be arranged to surround each of the main holes 14.

In the above-described embodiment, an example in which the auxiliary holes 22 made of round holes has been described, but the present disclosure is not limited to this. The auxiliary holes 22 may be configured by, for example, curved slit holes that surround the periphery of the main hole 14. In this case, the auxiliary hole 22 is not limited to a plurality of slit holes, but may be a single slit hole.

In the above-described embodiment, the main flow passage 18 and the auxiliary flow passage 24 are formed inside the single duct 16, but the present disclosure is not limited to this. In the air discharge device 1, for example, a portion of the duct 16 forming the main flow passage 18 and a portion of the duct 16 forming the auxiliary flow passage 24 may be separately configured.

In the above-described embodiment, the air discharge unit 10 having the flange 20 is illustrated, but the air discharge unit 10 is not limited to this. The air discharge unit 10 may be configured, for example, to a structure having the hole forming member 12 and the duct 16 but without having the flange 20.

In the above-described embodiment, an example in which the air discharge device 1 of the present disclosure is applied to the air outlet of the air conditioning unit that air-conditions the vehicle compartment is illustrated, but the present disclosure is not limited to this. The air discharge device 1 of the present disclosure is not limited to a moving body such as a vehicle, but can be widely applied to an air outlet of an installed air conditioning unit for a home use. In addition, the air discharge device 1 of the present disclosure is not limited to be applied to an air conditioning unit that air-conditions a room, but may be applied to, for example, an air outlet of a humidifying device that humidifies a room or an air outlet of a temperature adjusting device for adjusting an air temperature that adjusts the temperature of a heat generator or the like.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, the present disclosure is not limited to the shape, positional relationship, and the like, except for the case of being specifically specified, the case of being fundamentally limited to a specific shape, positional relationship, and the like.

(Overview)

According to a first aspect shown in part or all of the above-described embodiments, an air discharge device includes an air discharge unit configured to discharge an air flow. The air discharge unit includes at least a main hole from which an air flow as a working air flow is blown out, and a separation structure configured to separate a central portion of a thickness of a velocity boundary layer of the working air flow from a center line of the main hole at a downstream side of an outlet of the main hole.

According to a second aspect, an air discharge unit of the air discharge device includes a main flow passage through which the air flow to be discharged from the main hole passes. The separation structure includes a layer reduction structure configured to reduce the thickness of the velocity boundary layer formed along an inner wall surface of the main flow passage.

As described above, when the thickness of the velocity boundary layer is reduced, the working air flow formed at the downstream side of the outlet of the main hole tends to have a top-hat type wind velocity distribution. In the top-hat type wind velocity distribution, the central portion of the thickness of the velocity boundary layer of the working air flow formed downstream of the outlet of the main hole is greatly separated from the center line of the main hole. Therefore, it is possible to suppress a reduction in the flow velocity of the central portion of the working air flow and to increase the reaching distance of the working air flow.

According to a third aspect, in the air discharge device, the main flow passage is provided with a contraction structure configured to contract the air flow flowing through the main flow passage as a layer reduction structure. In this way, if the contraction structure is provided for the main flow passage, a flow velocity difference between the vicinity of the center line of the main hole and the vicinity of the inner wall surface is reduced due to the contraction flow in the main flow passage, and the thickness of the velocity boundary layer can be reduced. It is possible to realize a structure in which the central portion of the thickness of the velocity boundary layer of the working air flow formed downstream of the outlet of the main hole is separated from the center line of the main hole.

According to a fourth aspect, in the air discharge device, the inner wall surface defining the main flow passage has a contracted shape section configured to reduce a flow passage cross-sectional area of the main flow passage from an upstream side to a downstream side in the air flow direction. A downstream end of the contraction structure, located at a downstream side in the air flow direction of the main flow passage, is positioned upstream of a downstream end of the contracted shape section in the air flow direction of the main flow passage.

When the contraction structure is arranged with respect to the main flow passage, the flow velocity of the air flow is reduced at a portion of the main flow passage where the contraction structure is arranged, and a concave wind velocity distribution may be likely formed on the downstream side of the contraction structure. If the airflow is blown out from the main hole with the concave wind velocity distribution, the core portion of the airflow blown out from the main hole may be easily disturbed.

However, because the downstream end of the contraction structure is positioned upstream of the downstream end of the contracted shape section, the contracted shape section causes a contraction flow even on the downstream side of the contraction structure, and thereby airflow can easily flow to the downstream side of the contraction structure. According to this, the flow velocity once reduced at the location where the contraction structure is arranged can be recovered downstream of the contraction structure, so that the working air flow formed downstream of the outlet of the main hole tends to become in a top-hat type wind velocity distribution.

According to a fifth aspect, in the air discharge device, the inner wall surface defining the main flow passage has a contracted shape section configured to reduce a flow passage cross-sectional area of the main flow passage from an upstream side to a downstream side in the air flow direction. An upstream end of the contraction structure, located at an upstream side in the air flow direction of the main flow passage, is positioned downstream of an upstream end of the contracted shape section in the air flow direction of the main flow passage. In this way, when the upstream end of the contraction structure is positioned on the downstream side of the upstream end of the contracted shape section, the contraction effect can be respectively obtained in the contraction structure and the contracted shape section.

According to a sixth aspect, in the air discharge device, the inner wall surface defining the main flow passage has a contracted shape section configured to reduce a flow passage cross-sectional area of the main flow passage from an upstream side to a downstream side in the air flow direction. An upstream end of the contraction structure, located at an upstream side in the air flow direction of the main flow passage, is positioned downstream of an upstream end of the contracted shape section in the air flow direction of the main flow passage. A downstream end of the contraction structure, located at a downstream side in the air flow direction of the main flow passage, is positioned upstream of a downstream end of the contracted shape section in the air flow direction of the main flow passage.

According to a seventh aspect, the contraction structure of the air discharge device has a streamlined cross-section shape along the flow direction of the air flowing through the main flow passage. As described above, because the contraction structure has a streamlined shape, a separation of the airstream on the surface of the contraction structure can be reduced, and turbulence of the airstream can be sufficiently suppressed. It is effective for increasing the reaching distance of the working air flow.

According to an eighth aspect, in the air discharge device, an uneven-shaped vertical vortex generation mechanism configured to generate a vertical vortex is provided at an upstream end of the contraction structure, located on the upstream side in the flow direction of the air flowing through the main flow passage. According to this, the airstream flowing around the contraction structure easily flows along the surface of the contraction structure due to the vertical vortex generated by the vertical vortex generation mechanism, and a turbulence of the working air flow accompanying the addition of the contraction structure can be suppressed.

According to a ninth aspect, the contraction structure is arranged in the main flow passage such that the downstream end of the contraction structure located on the downstream side in the air flow direction of the air flowing through the main flow passage does not protrude from the main hole to the outside, in the air discharge device. According to this, the air flow blown out from the main hole is not disturbed by the contraction structure, and thereby the attenuation of the flow velocity in the central portion of the working air flow can be sufficiently suppressed.

According to a tenth aspect, in the air discharge device, at least a part of the main flow passage is provided with an uneven portion as a layer reduction structure in which concave portions and convex portions are alternately arranged along an air flow direction in the main flow passage. In this way, when the uneven portion is provided on a part of the inner wall surface of the main flow passage, the vortex generated inside the uneven portion plays a role of a ball bearing, so that the coefficient of friction on the inner wall surface of the main flow passage can be made smaller. Therefore, a difference in the flow velocity between the vicinity of the center line of the main hole and the vicinity of the inner wall surface can be reduced, and the thickness of the velocity boundary layer can be reduced. It is possible to realize a structure in which the central portion of the thickness of the velocity boundary layer of the working air flow formed downstream of the outlet of the main hole is separated from the center line of the main hole.

According to an eleventh aspect, in the air discharge device, the main flow passage is provided with an enlarged portion having a cross-sectional area larger than an opening area of the main hole, as a layer reduction structure. In this way, if a structure with the enlarged portion is provided for the main flow passage, a flow velocity difference between the vicinity of the center line of the main hole and the vicinity of the inner wall surface is reduced due to the contraction flow in the main flow passage, and the thickness of the velocity boundary layer can be reduced. It is possible to realize a structure in which the central portion of the thickness of the velocity boundary layer of the working air flow formed downstream of the outlet of the main hole is separated from the center line of the main hole.

According to a twelfth aspect, in the air discharge device, the main hole is enlarged so that the inner wall surface of the main hole is away from the center line of the main hole as toward the downstream side in the air flow direction. According to this, the velocity boundary layer of the working air flow, which is formed downstream of the outlet of the main hole in accordance with the shape of the inner wall surface of the main hole, can be likely made to be away from the center line of the main hole. In this case, it is possible to realize a structure in which the central portion of the thickness of the velocity boundary layer of the working air flow formed downstream of the outlet of the main hole is separated from the center line of the main hole.

What is claimed is:

1. An air discharge device comprising:
an air discharge unit configured to discharge air, wherein the air discharge unit includes
at least one main hole from which an air flow is blown out as a working air flow, and
a fixed separation structure configured to separate a central portion of a thickness of a velocity boundary layer of the working air flow from a center line of the main hole at a downstream side of the main hole, wherein
the air discharge unit includes a main flow passage through which the working air flow to be blown from the main hole passes,
the separation structure includes a layer reduction structure configured to reduce the thickness of the velocity boundary layer formed along an inner wall surface of the main hole,
the layer reduction structure includes a contraction structure having a teardrop shaped cross-section provided in the main flow passage, the contraction structure being configured to contract the air flow flowing through the main flow passage,
an inner wall surface defining the main flow passage has a contracted shape section configured to reduce a passage cross-sectional area of the main flow passage from an upstream side to a downstream side in an air flow direction, and
a downstream end of the contraction structure, located at a downstream side in the air flow direction of the main flow passage, is positioned downstream of an upstream end of the contracted shape section in the air flow direction of the main flow passage.

2. The air discharge device according to claim 1, wherein an upstream end of the contraction structure, located at an upstream side in the air flow direction of the main flow passage, is positioned upstream of an upstream end of the contracted shape section in the air flow direction of the main flow passage.

3. The air discharge device according to claim 1, wherein an upstream end of the contraction structure, located at an upstream side in the air flow direction of the main flow passage, is positioned upstream of an upstream end of the contracted shape section in the air flow direction of the main flow passage, and a downstream end of the contraction structure, located at a downstream side in the air flow direction of the main flow passage, is positioned upstream of a downstream end of the contracted shape section in the air flow direction of the main flow passage.

4. The air discharge device according to claim 1, wherein the contraction structure is located closer to an inlet of the main flow passage than the at least one main hole.

5. The air discharge device according to claim 1, wherein a larger portion of the teardrop shaped contraction structure is located closer to an inlet of the main flow passage than the at least one main hole.

6. The air discharge device according to claim 1, wherein the at least one main hole having an elliptical shape.

\* \* \* \* \*